United States Patent [19]

Godard et al.

[11] 4,138,644

[45] Feb. 6, 1979

[54] ADAPTIVE PHASE DETECTION METHOD AND APPARATUS

[75] Inventors: Dominique N. Godard, Le Rouret; Andrzej T. Milewski, Saint-Jeannet, both of France

[73] Assignee: International Business Machines Corporation, Armonk, N.Y.

[21] Appl. No.: 853,791

[22] Filed: Nov. 21, 1977

[30] Foreign Application Priority Data

Dec. 23, 1976 [FR] France .................................. 76 39689

[51] Int. Cl.² ............................................. H04L 27/22
[52] U.S. Cl. ...................................... 325/320; 328/162
[58] Field of Search ...................... 328/133, 134, 162; 329/50, 110, 136; 178/69 M, 70 R, 67, 88; 364/728, 737; 340/146.1 D, 170; 179/15 BS; 333/18; 325/320, 321, 323, 473

[56] References Cited

U.S. PATENT DOCUMENTS

| 4,032,847 | 6/1977 | Unkauf | 325/473·X |
| 4,038,540 | 7/1977 | Roberts | 364/728 |
| 4,041,418 | 9/1977 | Koeth | 333/18 |

*Primary Examiner*—Benedict V. Safourek
*Attorney, Agent, or Firm*—John B. Frisone

[57] ABSTRACT

An adaptive phase detection method and apparatus is described which provides an estimated value $\hat{\phi}_n$ of the phase $\phi_n$ transmitted at a signalling instant nT in a data transmission system using a M-phase PSK modulation technique. The system compensates for the effects of the intersymbol interference created by not more than one leading lobe of a succeeding signal and an arbitrary number of trailing lobes of preceding signals caused by the impulse response of the transmission channel. The method of the present invention mainly comprises the steps of:

determining at least two residual errors, each of which is obtained by subtracting from the phase $\psi_n$ received at signalling instant nT the sum of one of the possible values which can be taken on by the transmitted signal at each signalling instant, i.e., one of the phases of the constellation, and the estimated value of the phase error due to the intersymbol interference corresponding to that phase of the constellation, comparing the residual errors thus obtained with each other, selecting the phase $\hat{\phi}_n$ which yields the smaller of the residual errors as the most probable transmitted phase $\phi_n$ of the constellation, and selectively adjusting the estimated phase errors in accordance with the residual errors.

12 Claims, 11 Drawing Figures

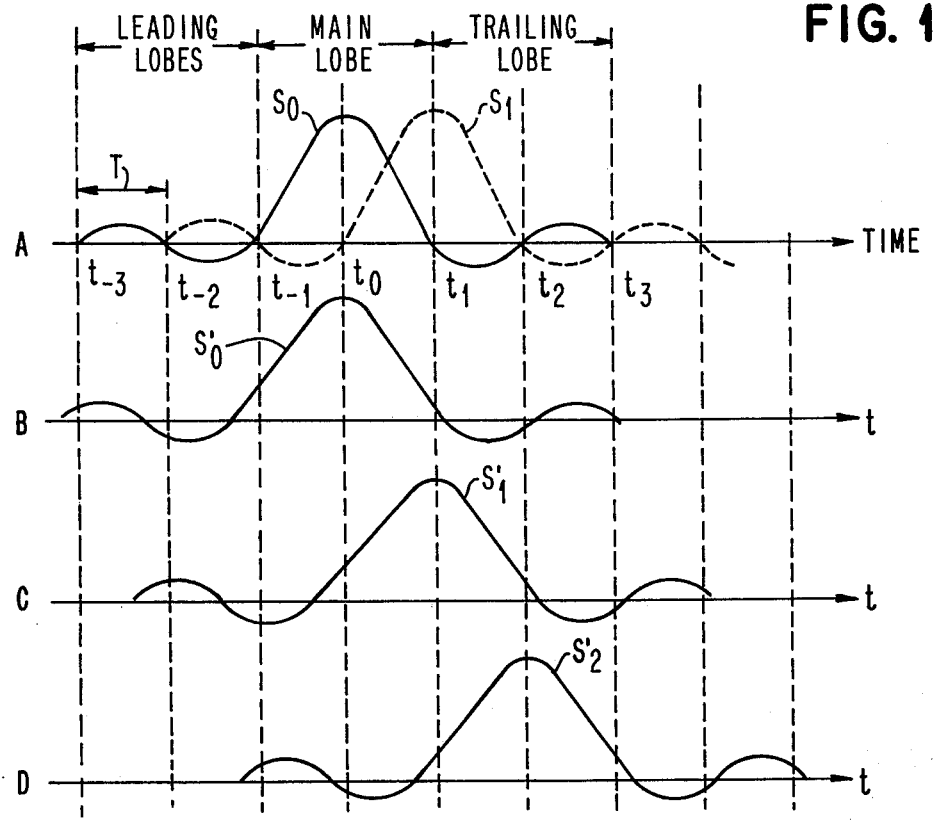
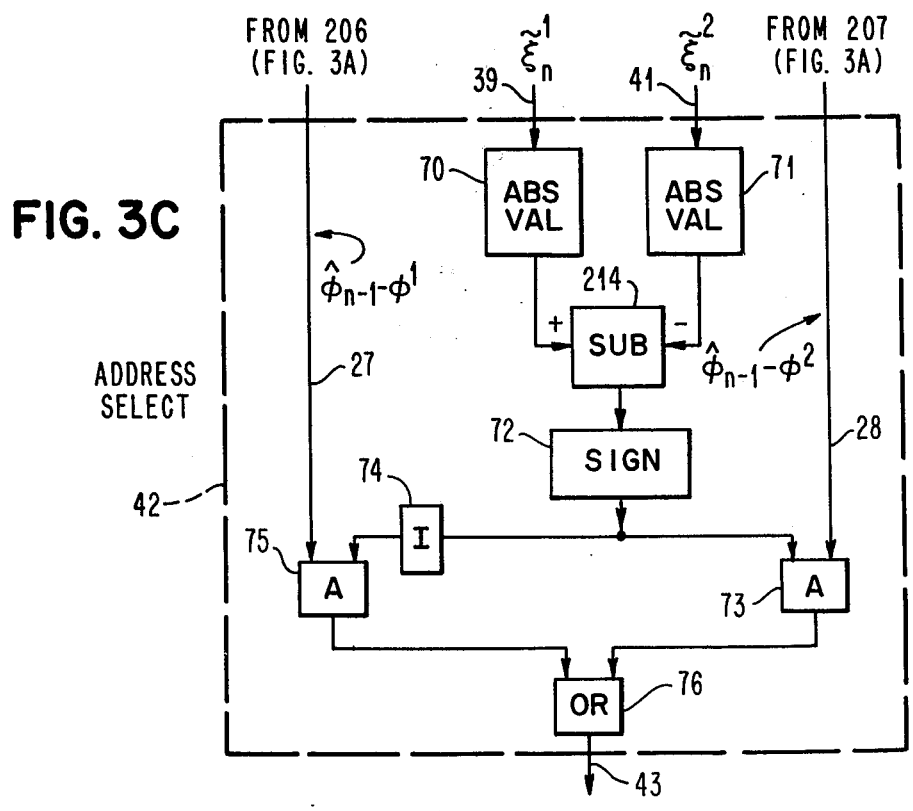

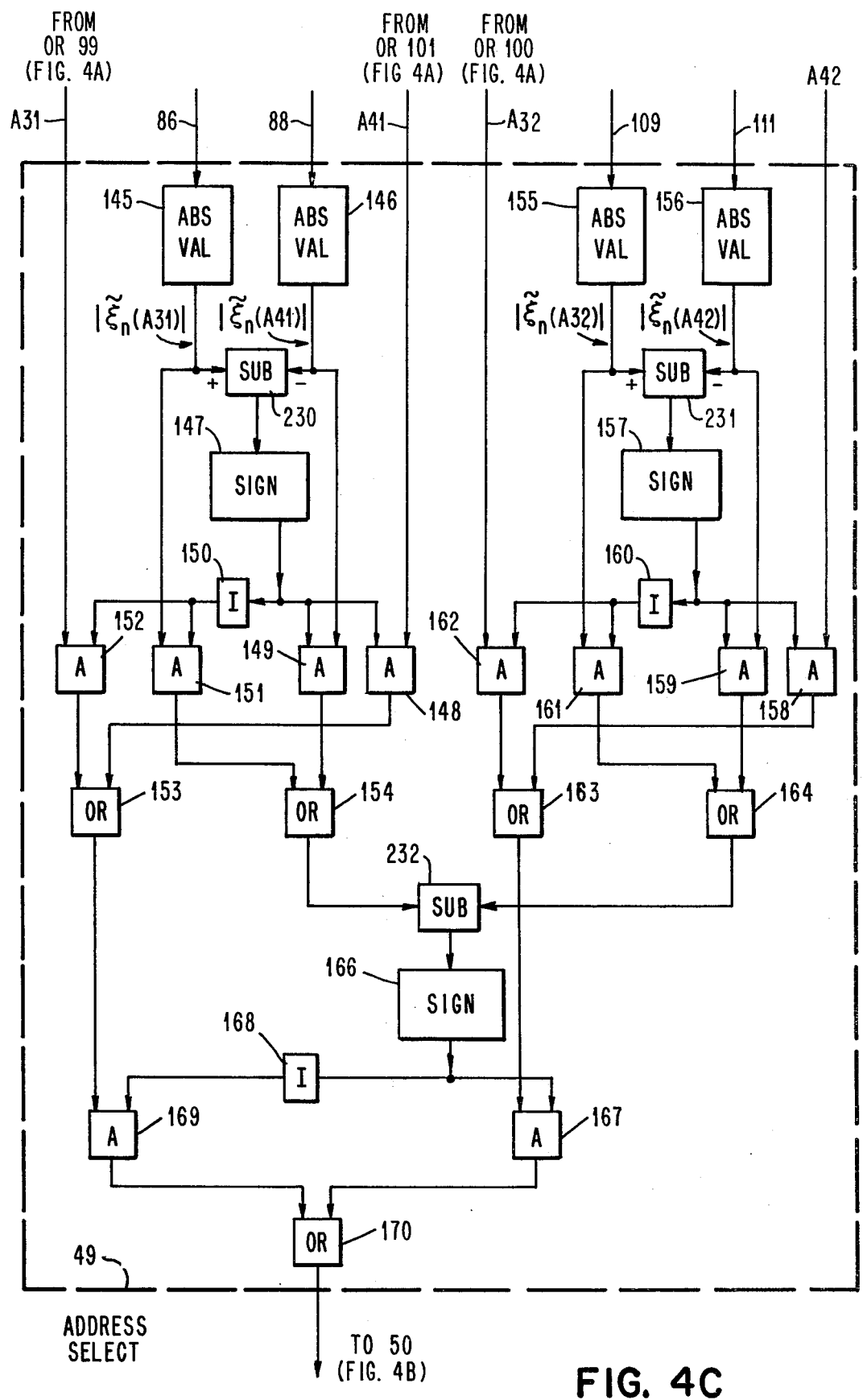

ADAPTIVE PHASE DETECTION METHOD AND APPARATUS

BACKGROUND OF THE INVENTION

This invention relates generally to systems designed to compensate for the linear distortions introduced by the transmission channels of digital data transmission systems. More particularly, the invention relates to an adaptive phase detection method and apparatus for a digital data transmission system that uses the phase-shift keying (PSK) modulation technique.

The widely used PSK modulation technique is described, for example, in books entitled "Data Transmission", by R. W. Bennett and J. R. Davey, Chapter 10, McGraw-Hill, New York, 1965, and "Principles of Data Communication", by R. W. Lucky, J. Salz and E. J. Weldon, Jr., Chapter 3, McGraw-Hill, New York, 1968. In the PSK modulation technique, the sequence of bits to be transmitted is first converted by groups of 2, 3 or 4 bits, into a sequence of symbols. The number of different symbols is generally equal to two raised to the power of the number of bits in a group. This sequence of symbols is then transmitted, one symbol at a time during periods which have a T-second spacing and which have a predetermined phase at specific points in the period called signalling instants. Each symbol may take the form of a pulse modulated by a carrier signal whose phase for each symbol exhibits a corresponding phase change relative to the phase of the immediately preceding symbol. These modulated pulse symbols are fed to a transmission channel whose output is connected to a data receiver. The function of the transmission channel is to provide at the receiver a signal relatively similar to the input signal applied thereto. The receiver examines the signal received from the transmission channel at each signaling instant to determine its phase and the corresponding transmitted data. In actual practice, mainly for reasons of cost, the telephone lines of the public network are most commonly used as transmission channels. However, telephone lines, while satisfactory for voice transmission purposes, are not quite adequate to transmit data pulses at a relatively high data rate with a very low probability of error. On any telephone line of a give quality, there will be amplitude and phase distortions that will alter the shape of the pulses being transmitted. At pulse transmission rates above some minimum rate, these distortions will create, at the signaling instants, an interaction between successive pulses, which makes it difficult for the receiver to correctly detect the data in the signal. This interaction is known as intersymbol interference. To compensate for the effects of the intersymbol interference, the receiver is usually provided with a device called an equalizer. One of the more widely used type of equalizer is the so-called automatic adaptive equalizer which has been discussed in many publications and is described, for example, in Chapter 6 of the book by R. W. Lucky et al. mentioned earlier. An equalizer generally consists of a network whose transfer function is adjusted to meet a given performance criterion. Such an equalizer is a complicated device which in a digital form requires a very high computing power and is, consequently, expensive. The incorporation of a digital equalizer in a receiver will, therefore, considerably increase the cost of the latter. The decision as to the type of equalizer which should be incorporated in a receiver will, of course, depend not only on the performance level required to enable the receiver to operate satisfactorily, but will also depend on the cost advantage to be gained thereby. An equalizer must be used in certain cases, for example, where the transmission rate is equal to or higher than 4800 bits per second (bps). On the other hand, an equalizer will not normally be required if, for example, the transmission rate is lower than 2400 bps or if the quality of the transmission line is very high. However, the use of an equalizer which would be unnecessary may be desirable in some cases, for example, in a receiver designed to accommodate a great many different lines some of which might have marginal characteristics in relation to accepted standards. In these cases, it is apparent that there is a need for an inexpensive device capable of compensating for the effects of the intersymbol interference without however requiring the very high computing power associated with an equalizer for high data rates. Accordingly, the present invention is designed to improve the phase detection system by the use of an apparatus which will compensate for the effects of the intersymbol interference.

OBJECTS OF THE INVENTION

It is, therefore, an object of the present invention to provide an adaptive phase detection method and apparatus which compensates for the effects of the intersymbol interference.

It is another object of the inventon to provide an adaptive phase detection method and apparatuswhich requires only a low computing power compared with that required by a digital equalizer.

It is still another object of the invention to provide an adaptive phase detection method and apparatus which can readily be integrated into a receiver and which uses existing technologies.

These and other objects are generally achieved through the use of an adaptive phase detection method and apparatus which provides an estimated value $\hat{\phi}_n$ of the phase $\phi_n$ transmitted at a signaling instant nT in a data transmission system using a M-phase PSK modulation technique, and can compensate for the effects of the intersymbol interference created by not more than one leading lobe and an arbitrary number of trailing lobes of the impulse response of the transmission channel. The method of the present invention mainly comprises the steps of:

- determining at least two different residual errors, each of which is obtained by subtracting from the phase $\psi_n$ actually received at a signaling instant nT, one of the possible phase values which could have been taken on by the signal transmitted at that signaling instant, i.e., one of the phases of a constellation, together with an estimated value of the phase error due to the intersymbol interference corresponding to that phase of the constellation,
- comparing the residual errors thus obtained with each other,
- deciding that the phase $\hat{\phi}_n$ which has the maximum likelihood of being the transmitted phase $\phi_n$, is that phase of the constellation which yields the smallest of the residual errors, and
- selectively adjusting the estimated phase errors in accordance with the residual errors.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 1 shows a group of waveforms helpful in gaining a better understanding of the invention.

FIGS. 3A and 3B, combined as shown in FIG. 3 represent an embodiment of the invention.

FIG. 3C is an exemplary embodiment of the address selection circuit 42 of FIG. 3B.

FIGS. 4A and 4B, combined as shown in FIG. 4, illustrate another embodiment of the invention.

FIG. 4C is an exemplary embodimet of the address selection circuit 113' of FIG. 4B.

Figure 2:
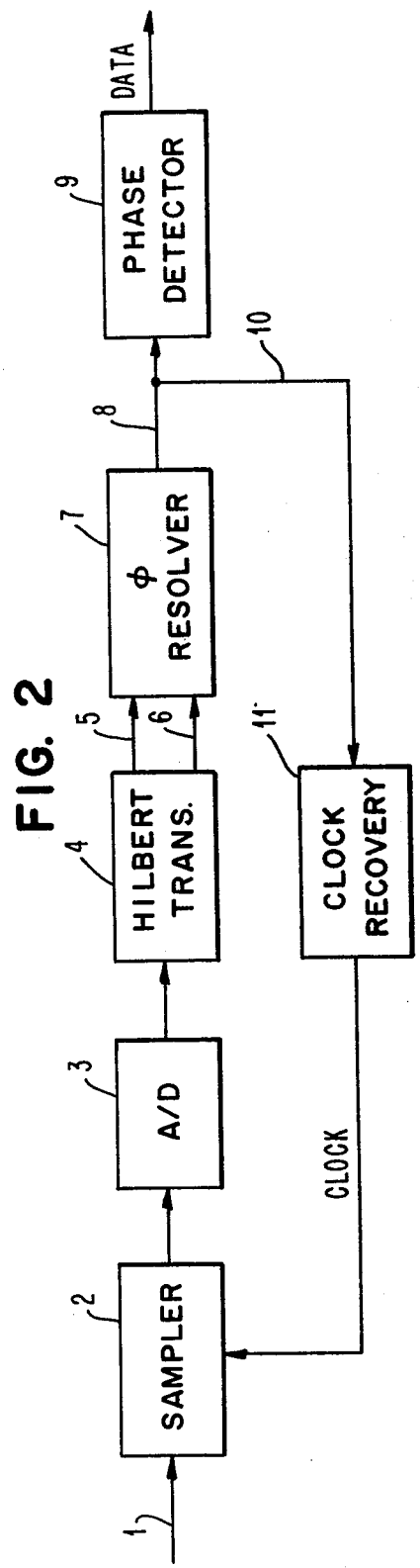
FIG. 2 is a block diagram of a PSK receiver incorporating the phase detector of the invention.

In order that the present invention may be more readily understood, it is believed necessary to first described the problems which existed and are solved by the invention. To this end, the intersymbol interference phenomenon will be described with reference to FIG. 1. The upper graph A represents one side of the envelope of an isolated data pulse $S_0$ supplied by the transmitter of a data transmission system using the PSK modulation technique. Such a pulse is often referred to as a signal element and is described, for example, in Chapter 4 of the book by R. W. Lucky et al. mentioned earlier. The shape of the envelope of this pulse is selected so as to approximate as closely as possible the impulse response of the transmission channel. The pulse envelope shown in line A of FIG. 1 corresponds to the transmission of an isolated phase value at signaling instant $t_0$. In the illustrated example, the puse extends over six T-second signaling periods and includes a main lobe centered at $t_o$, two leading lobes, and two trailing lobes. The phase of the pulse at $t_0$ is representative of the phase being transmitted. It should be noted that although the pulse extends over six signaling periods, its amplitude is non-zero at $t_o$ and is zero at the adjacent signaling instants $t_{-3}$, $t_{-2}$, $t_{-1}$, $t_1$, $t_2$, $t_3$. Thus, another phase value can be transmitted at instant $t_1$ by sending a pulse $S_1$ having an envelope similar to $S_0$ but centered at $t_1$. It will be seen that pulses $S_o$ and $S_1$ do not interfere with each other at the signaling instants and that, assuming the use of an ideal transmission channel introducing no noise or distortion, an examination of the signals received at instants $t_0$ and $T_1$ would permit retrieving the exact phases transmitted. In practice, the transmission channel would introduce amplitude and phase distortions, so that the pulses obtained at the receiving end would be somewhat distorted.

Line B represents the envelope of an isolated pulse $S_0$ as distorted by the transmission channel and received at the input of the receiver. The distorted pulse envelope of $S_0$ is designated $S'_0$ in graph B. Note that the amplitude of the envelope of pulse $S'_0$ is no longer zero at instants $T_{-3}$, $t_{-2}$, $t_{-1}$, $t_1$, $t_2$ and $t_3$. Graph C represents the envelope of the isolated pulse $S_1$ as distorted by the transmission channel, this pulse being designated $S'_1$. Graph D illustrates the envelope of a distorted, isolated pulse $S_2$ centered at instant $T_2$ and designated $S'_2$. While the three pulses $S'_0$, $S'_1$, $S'_2$ have been isolated in graphs B, C, and D, respectively, it will be appreciated that these pulses are, in fact, superimposed on the same transmission line and that as a result the signal fed to the receiver is a composite signal. It will be observed that at each signaling instant there may be an interference between pulses $S'_0$, $S'_1$ and $S'_2$. For example, at instant $T_0$, there can be an interference between the main lobe of $S'_0$, the first trailing lobe of $S'_1$ and the second trailing lobe of $S'_2$. This interference modifies the received amplitude of the signal transmitted at each signaling instant and may result in the data being incorrectly detected by the receiver. Graphs A-D illustrate a pulse, or impulse response of the transmission channel, that includes only two leading lobes and two trailing lobes; in practice, the number of these lobes, also called secondary lobes, can vary and only some of them contribute significantly to the intersymbol interference. It is clear from graphs B-D that the interference modifies the amplitude of the transmitted pulses, but it will also be readily apparent that it modifies the phase of these pulses at the signaling instants.

As has been mentioned, it is the object of this invention to provide a phase detection method and apparatus for minimizing the effects of intersymbol interference in a system that uses the PSK modulation technique. To illustrate the context within which the invention finds application, a simplified block diagram of a PSK receiver incorporating a phase detector of the present invention has been shown in FIG. 2. For the sake of simplicity, only those parts of the receiver which are necessary to implement the invention have been shown in the figure. The signal received from the transmission channel is applied via line 1 to the input of a sampling device 2 which samples the signal at a rate of K/T Hz, K being an integer, where 1/T Hz represents the signaling rate. Device 2 supplies the amplitude values assumed by the received signal at instants which are sub-multiples of the signaling instants, i.e., samples of the received signal. These samples are fed to an analog-to-digital converter 3 which converts them to digital values. The digital values of the samples are then fed to a Hilbert transformer 4 which provides on lines 5 and 6 the in-phase and quadrature components, respectively, of the signals which were received at the signaling instants. The Hilbert transformer 4 is a well-known device that is widely used in data transmission. This transformer is, in fact, a digital filter whose transfer function is $$H(f) = \exp(-j\pi/2) \times \text{sign of } f$$

The in-phase and quadrature components supplied by the Hilbert transformer 4 are applied via lines 5 and 6 to the input of a resolver 7 which provides the digitally coded values of the phase and the signal received at the signaling instants. A description of a resolver is given, for example, in an article entitled, "The Cordic Trigonometric Computing Technique", by J. E. Valder, in IRE Transactions on Electronic Computers, pages 330-334, September, 1959. Another type of resolver is described in U.S. Pat. 3,825,737 issued July 23, 1974 to Alain Croisier, with the title, "Digital Phase Detector" and assigned to the assignee of this application. The counterpart patent is French Pat. No. 71 47850 filed by the assignee of the present applicant Dec. 21, 1971, and entitled, "Detecteur de phase digital", publication No. 2,164,544. The phase values supplied by resolver 7 are applied via line 8 to the input of the phase detector 9 of the present invention which derives the transmitted data therefrom. The phase values from resolver 7 are also fed via line 10 to a clock recovery device 11 which derives therefrom a clock signal defining the sampling instants. Many types of clock recovery systems are currently available; a description of such a device may be found, for example, in assignee's U.S. patent application Ser. No. 812,971 filed July 5, 1977 by M. Choquet et al. under the title of "Synchronizing Device for the Receiver Clock of a Data Transmission System using PSK Modulation" and corresponding to French Pat. No. 76 21564, filed by the assignee of the present applicant on July 9, 1976 with the title, "Procede et dispositif de synchronisation de l'horloge du recepteur d'un systeme de transmission de donnees en modulation PSK" (Method and Device for Synchronizing the Receiver Clock in a Data Transmission System Using PSK Modulation). The clock signal supplied by clock recovery device 11 controls the timing of sampling device 2.

The phase detection method used in an apparatus of the present invention will now be described in detail.

In a data transmission system which uses a PSK modulation technique, the phase $\psi_n$ of the signal received at a signaling instant nT, i.e., the $n^{th}$ signaling instant, may be expressed as $$\psi_n = \phi_n + \epsilon_n \quad (1)$$

where
  $\phi_n$ is the phase of the signal transmitted at instant nT, and
  $\epsilon_n$ is the phase error due to intersymbol interference which alters the received phase $\psi_n$.

In expression (1), the effects of other noise factors, compensation for which is outside the scope of this invention, have been ignored.

The method of the present invention permits minimizing the effects of the intersymbol interference created by the first leading lobe of a following signal, the present signal, and/or an arbitrary number of trailing lobes of prior signals caused by the impulse response of the transmission channel. In order that the invention may be more readily understood, detailed descriptions will now be given of three cases wherein the interference with a signal is created by the first trailing lobe of the earlier signal, this being termed Case A hereafter, then by the first trailing lobe and the first leading lobe of the succeeding signal (Case B), and finally by the first leading lobe and the trailing lobes of two prior signals (Case C). On the basis of these three cases, those skilled in the art should experience no difficulty in extending the inventive method to an arbitrary number of trailing lobes.

Case A — First Trailing Lobe

This case assumes that the transmission channel is such that only the first trailing lobe of the impulse response to the next prior signal will create significant intersymbol interference.

Phase $\psi_n$ of the signal will be altered by an interference term created by the first trailing lobe of the pulse corresponding to the phase $\psi_{n-1}$ transmitted at instant (n−1)T. The phase error $\epsilon_n$ is only dependent upon the phase change $(\phi_{n-1} - \phi_n)$. For clarity, such a phase error will be written $$\epsilon_n (\phi_{n-1} - \phi_n)$$

In a transmission system using an M-phase PSK modulation technique, the phase transmitted at each signaling instant can assume a value selected from a finite number of M distinct values. Such a finite set of values is often referred to as a "constellation". The M phases of the constellation will be written $$\phi^l \text{ for } l = 0, 1, 2, \ldots, (M-1)$$

with, for example, $$\phi^l = l(2\pi/M) \; l = 0, 1, 2, \ldots, (M-1). \quad (2)$$

The phase change $(\phi_{n-1} - \phi_n)$ can also assume M distinct values:
$$\phi_{n-1} - \phi_n = m = (2\pi/M); m = 0, 1, 2, \ldots, (M-1). \quad (3)$$

The phase error $\epsilon_n(\phi_{n-1} - \phi_n)$ can also be one of M possible distinct values:

$$\epsilon_n (m \frac{2\pi}{M}) \; m = 0, 1, \ldots, (M-1).$$

In accordance with the detection method of the present invention, it is assumed that at a signaling instant nT, an estimated value $\hat{\phi}_{n-1}$ of the phase $\phi_{n-1}$ of the prior signal and estimates $\hat{\epsilon}_n$ (m $2\pi/M$) of the M possible values of the phase error are available. Accordingly, the present method comprises the following steps:

Step 1

This step consists in calculating the M residual errors $$\tilde{\epsilon}_n^l = \psi_n - \phi^l - \hat{\epsilon}_n(\hat{\phi}_{n-1} - \phi^l) \text{ for } l = 0, 1, \ldots, (M-1) \quad (4)$$

where
$\hat{\epsilon}_n(\hat{\phi}_{n-1} - \phi^l)$ is an estimated value of $\epsilon_n(\hat{\phi}_{n-1} - \phi^l)$
Note that the estimates of the possible values of the phase error, or estimated phase errors, $$\hat{\epsilon}_n(\hat{\phi}_{n-1} - \phi^l), \; l = 0, 1, \ldots, (M-1)$$

designate the estimated phase errors $$\hat{\epsilon}_n (m \frac{2\pi}{M}), \; m = 0, 1, \ldots, (M-1).$$

The notation $\hat{\epsilon}_n(\hat{\phi}_{n-1} - \phi^l)$ enables each value of $\phi^l$ to be associated with the corresponding phase error in expression (4).

In what follows, an estimated value of a possible phase error will be referred to as an estimated phase error.

Step 2

The phase $\hat{\phi}_n$ which has the maximum likelihood of being the phase $\phi_n$ transmitted at tine nT is that phase $\phi^i$ of the constellation which yields the smallest residual error $$\text{Min}_l |\tilde{\epsilon}_n^l| = |\tilde{\epsilon}_n^i| \Longrightarrow \hat{\phi}_n = \phi^i \quad (5)$$

Step 3

Obviously, the M estimated phase errors are not known a priori. According to the invention, they are determined in an adaptive manner. At the end of step 2, it was assumed that phase $\hat{\phi}_n$ was phase $\phi^i$ of the constellation. A new estimated of one of the possible values of the phase error which will be used at instant $(n+1)T$ is obtained in accordance with the expression $$\hat{\epsilon}_{n+1}(\hat{\phi}_{n-1}-\phi^l) = \hat{\epsilon}_n(\hat{\phi}_{n-1}-\phi^l) + \mu \tilde{\epsilon}_n^i \qquad (6)$$

where $\mu$ is a small positive constant which may be, for example, a negative power of 2.

Note that a single estimated phase error is adjusted at each signaling instant. For example, if $$\hat{\phi}_{n-1} - \phi^i = m_i(2\pi/M)$$

at instant $(n+1)T$, then the following estimated values will be used:

$$\hat{\epsilon}_{n+1}(m\frac{2\pi}{M}) = \hat{\epsilon}_n(m\frac{2\pi}{M}) \text{ for } m \neq m_i$$

and $$\hat{\epsilon}_{n+1}(m_i\frac{2\pi}{M})$$

as defined by (6).

Note Step 1 of the above process theoretically requires the calculation of M residual errors $\epsilon_n^l$ defined by relation (4). In practice, by first determining which two phases of the constellation are closest to $\psi_n$, the calculation of the M residual errors can be limited to those which involve said two phases, as is done in the apparatus illustrated in FIG. 3, which will be described later.

Case B — First Leading Lobe And First Trailing Lobe

The method of the present invention will now be described in relation to the case wherein the first leading lobe of the succeeding signal and the first trailing lobe of the prior signal due to the impulse response of the transmission channel create significant intersymbol interference. In this case, phase $\psi_n$ is altered by an interference term created by the first trailing lobe of the pulse corresponding to phase $\phi_{n-1}$ and by the first leading lobe of the pulse corresponding to phase $\phi_{n+1}$ transmitted at instant $(n+1)T$. The phase error which alters the received phase $\psi_n$ is dependent upon both of the phase changes $(\phi_{n+1}-\phi_n)$ and $(\phi_{n-1}-\phi_n)$ which, for example, will be $$\phi_{n+1}-\phi_n = j(2\pi/M) \text{ for } j = 0, 1, \ldots, (M-1)$$

$$\phi_{n-1}-\phi_n = k(2\pi/M) \text{ for } k = 0, 1, \ldots, (M-1)$$

The phase error $\epsilon_n$ will be written $$\epsilon_n = \theta_n(\phi_{n+1}-\phi_n, \phi_{n-1}-\phi_n)$$

Since each of the phase changes $\phi_{n+1}-\phi_n$ and $\phi_{n-1}-\phi_n$ can take on M distinct values, the phase error can assume $M^2$ distinct values.

To determine $\hat{\phi}_n$, it will be assumed that received phases $\psi_{n+1}$ and $\psi_n$ are available as well as the estimated value $\hat{\phi}_{n-1}$ of phase $\phi_{n-1}$ and the estimated values of the $M^2$ phase errors. Observe that the assumption of the availability of $\psi_{n+1}$ implies that the value of phase $\hat{\phi}_n$ is determined at instant $(n+1)T$. The method of the invention comprises the following steps.

Step 1

Since phase $\phi_{n+1}$ is unknown, the $M^2$ residual errors must be calculated:

$$\tilde{\epsilon}_n^{jl} = \psi_n - \phi^l - \hat{\theta}_n(\phi^j - \phi^l, \hat{\phi}_{n-1} - \phi^l)$$
for $j, l = 0, 1, \ldots, (M-1)$ \qquad (7)

where $\phi^j$ represents the M phases of the constellation that $\phi_{n+1}$ can assume.

Step 2

The phase $\phi_n$ with the maximum likelihood of being phase $\phi_n$ is that phase of the constellations which yields the smallest residual error.

$$\text{Min}_{j,l}|\tilde{\epsilon}_n^{jl}| = |\tilde{\epsilon}_n^{jp}| \implies \hat{\phi}_n = \phi^p \qquad (8)$$

Step 3

As in step 3 of Case A, the estimated phase errors are determined in an adaptive manner.

The direct application to Case B of the adaptive adjustment method of Case A, as defined by expression (6), would yield the expression $$\hat{\theta}_{n+1}(\phi_{n+1}-\hat{\phi}_n, \hat{\phi}_{n-1}-\hat{\phi}_n) = \hat{\theta}_n(\phi_{n+1}-\hat{\phi}_n, \hat{\phi}_{n-1}-\hat{\phi}_n) + \mu \tilde{\epsilon}_n^i$$

where $\tilde{\epsilon}_n^i$ is the smallest residual error.

Actually, this expression is dependent upon the phase change $\phi_{n+1} - \hat{\phi}_n$ which is indeterminate since $\phi_{n+1}$ is unknown. It is, therefore, preferable in Case B to define the adaptive adjustment method by means of expression (9):

$$\hat{\theta}_{n+1}(\hat{\phi}_n-\hat{\phi}_{n-1}, \hat{\phi}_{n-2}-\hat{\phi}_{n-1}) = \hat{\theta}_n(\hat{\phi}_n-\hat{\phi}_{n-1}, \hat{\phi}_{n-2}-\hat{\phi}_{n-1}) + \mu \epsilon_{n-1} \qquad (9)$$

where $\tilde{\epsilon}_{n-1}$ is the residual error that was observed at the preceding signaling instant and corresponds to the combination of phase changes $$\hat{\phi}_n - \hat{\phi}_{n-1}, \hat{\phi}_{n-2} - \hat{\phi}_{n-1}$$

and $\mu$ is a small positive constant which may be equal to a negative power of 2.

Note that, as in Case A, only one of the $M^2$ estimated phase errors is adjusted at each signaling instant, the other estimated values remaining unchanged.

Note As in Case A, the number of residual errors to be calculated in step 1 can be reduced by identifying the two phases of the constellation which are closest to $\psi_{n+1}$ and $\psi_n$ and by calculating only those residual errors which involve said two phases, as is done in the apparatus of FIG. 4 to be described later.

Case C — First Leading Lobe and First Two Trailing Lobes

Where intersymbol interference is created by the first leading lobe of the succeeding signal and the trailing lobes of the two immediately prior signals due to the impulse response of the transmission channel, phase $\psi_n$ is altered by the first leading lobe of the pulse corresponding to $\phi_{n+1}$, by the first trailing lobe of the pulse corresponding to $\phi_{n-1}$, and by the second trailing lobe of the pulse corresponding to $\phi_{n-2}$.

The phase error is dependent upon the phase changes $(\phi_{n+1} - \phi_n)$, $(\phi_{n-1} - \phi_n)$, and $(\phi_{n-2} - \phi_n)$ For example, the following will be obtained:

$\phi_{n+1} - \phi_n = j(2\pi/M) \, j = 0, 1, \ldots, (M-1)$ $\phi_{n-1} - \phi_n = k(2\pi/M) \, k = 0, 1, \ldots, (M-1)$ $\phi_{n-2} - \phi_n = s(2\pi/M) \, s = 0, 1, \ldots, (M-1)$.

Since each of these phase changes can assume M distinct values, the phase error can take on $M^3$ distinct values.

However, if the second trailing lobe is relatively small compared with the first leading lobe and the first trailing lobe (which would be true in practice), a good approximation to the phase error can be written as:

$$\epsilon_n = \theta_n (\phi_{n+1} - \phi_n, \phi_{n-1} - \phi_n) + \chi_n (\phi_{n-2} - \phi_n) \quad (10)$$

The phase error appears in expression (10) as a sum of two phase error terms.

To obtain $\hat{\phi}_n$, it will be assumed that received phases $\psi_{n+1}$ and $\psi_n$ are available as well as estimated phases $\hat{\phi}_{n-1}$, $\hat{\phi}_{n-2}$ and estimated values of the two terms of the possible phase errors.

$\hat{\theta}_n (\phi_{n+1} - \phi_n, \phi_{h-1} - \phi_n)$ and $\hat{\chi}_n (\phi_{n-2} - \phi_n)$ In this instance, the method of the present invention includes the following steps:

Step 1

This consists in calculating the residual errors $$\widetilde{e}_n^{jl} = \psi_n - \phi^l - \hat{\theta}_n (\phi^j - \phi^l, \hat{\phi}_{n-1} - \phi^l) - \hat{\chi}_n (\hat{\phi}_{n-2} - \phi^l) \text{ for } j, l = 0, 1, \ldots, (M-1). \quad (11)$$

Note that we have $\widetilde{e}_n^{jl} = \widetilde{\epsilon}_n^{jl} - \chi_n (\hat{\phi}_{n-2} - \phi^l)$ where
$\widetilde{\epsilon}_n^{jl}$ is the residual error obtained in step 1 of Case B, but only represents a partial residual error in Case C.

Step 2

The phase $\hat{\phi}_n$ with the maximum likelihood of being phase $\phi_n$ is that phase of the constellation which yields the smallest of the residual errors $\widetilde{e}_n^{jl}$.

Step 3

The two estimated phase error terms $\hat{\theta}_n$ and $\hat{\chi}_n$ are determined separately in an adaptive manner.

The term $\hat{\theta}_n$ is adjusted as in step 3 of Case B, except that $\widetilde{e}_{n-1}$ is substituted for $\widetilde{\epsilon}_{n-1}$.

Expression (9) becomes:

$$\hat{\theta}_{n+1}(\hat{\phi}_n - \hat{\phi}_{n-1}, \hat{\phi}_{n-2} - \hat{\phi}_{-1}) = \hat{\theta}_n (\hat{\phi}_n - \hat{\phi}_{n-1}, \hat{\phi}_{n-2} - \hat{\phi}_{n-1}) + \mu \widetilde{e}_{n-1} \quad (9)$$

where
$\widetilde{e}_{n-1}$ is the residual error observed at the preceding signaling instant and which corresponds to the combination of phase changes $\hat{\phi}_n - \hat{\phi}_{n-1}$, $\hat{\phi}_{n-2} - \hat{\phi}_{n-1}$, and $\mu$ is a small positive constant which may be equal to a negative power of 2.

The term $\hat{\chi}_n$ is adjusted as follows:

To ensure that the adjustment of term $\hat{\chi}_n$ and that of term $\hat{\theta}_n$ are coherent as per (9'), a new value of $\hat{\chi}_n$ is obtained in accordance with expression (12) below $$\hat{\chi}_{n+1}(\hat{\phi}_{n-3} - \hat{\phi}_{n-1}) = \hat{\chi}_n(\hat{\phi}_{n-3} - \hat{\phi}_{n-1}) + \mu \widetilde{e}_{n-1} \quad (12)$$

where
$\widetilde{e}_{n-1}$ is the residual error observed at the preceding signaling instant and which corresponds to the combination of phase changes $\hat{\phi}_n - \hat{\phi}_{n-1}, \hat{\phi}_{n-2} - \hat{\phi}_{n-1}.$ Only one value of each of terms $\hat{\theta}_n$ and $\hat{\chi}_n$ is adjusted at each signaling instant, the other estimated values remaining unchanged.

Note What has been stated above in the Notes on Cases A and B also apply to Case C and to the apparatus illustrated in FIG. 5, which will be described later.

Figure 4:
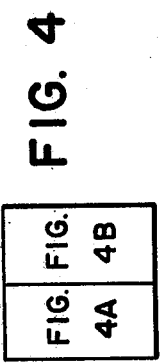
FIG. 4 is a diagram illustrating how
Figure 3:
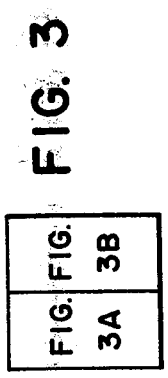
FIG. 3 is a diagram showing how
Figure 5:
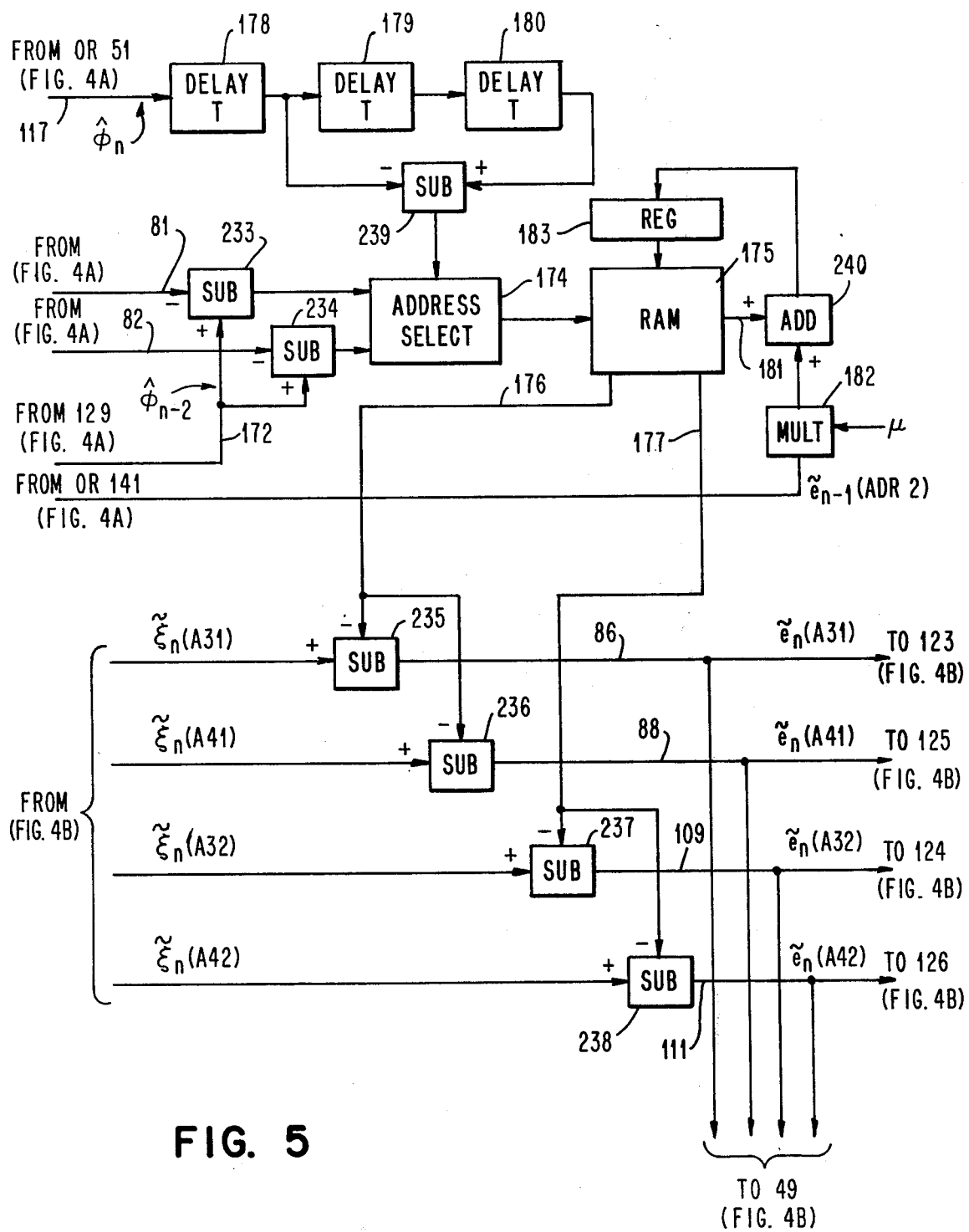
FIG. 5 is a structure which may be added to the apparatus of FIG. 4 to represent another embodiment of the invention.

Those skilled in the art will appreciate that the phase detection method just described in relation to Cases A-C and to be complemented by a description of the devices shown in FIGS. 3-5, can also be used to compensate for the effects of the intersymbol interference created by not more than the first leading lobe and/or an arbitrary number of trailing lobes.

The method of the invention in its preferred, most general form, may be defined as follows: (To prevent confusion with Cases A and B, some notations have been modified).

Where the intersymbol interference is created solely by trailing lobes of N prior signals, the inventive method mainly comprises the steps of:

calculating at least two of the residual errors $$\widetilde{E}_n^L = \psi_n - \phi^L - \hat{E}_n^L (\hat{\phi}_{n-1} - \phi^L, \hat{\phi}_{n-2} - \phi^L, \ldots, \hat{\phi}_{n-N} - \phi^L)$$

where
$\phi^L$ represents the phases of the constellation, and
$\hat{E}_n^L$ represents the estimated phase errors,
comparing the residual errors so obtained with each other,
selecting as phase $\hat{\phi}_n$ that phase of the constellation which yields the smallest residual error, and
adjusting the estimated phase error corresponding to phase $\hat{\phi}_n$ in accordance with the smallest residual error.

Where the intersymbol interference is created by a first leading lobe and the trailing lobes of N prior signals, the inventive method mainly comprises the steps of:

calculating at least two of the residual errors $$\widetilde{E}_n^{JL} = \psi_n - \phi^L - \hat{E}_n^{JL} (\phi^J - \phi^L, \hat{\phi}_{n-1} - \phi^L, \ldots, \hat{\phi}_{n-N} - \phi^L)$$

where
$\phi^J$ and $\phi^L$ represent the phases of the constellation,
comparing the residual errors so obtained with each other,
selecting as phase $\hat{\phi}_n$ that phase of the constellation which yields the smallest residual error, and
adjusting the estimated phase error corresponding to the combination of phase changes $$\hat{\phi}_n - \hat{\phi}_{n-1}, \hat{\phi}_{n-2} - \hat{\phi}_{n-1}, \ldots, \hat{\phi}_{n-(N+1)} - \hat{\phi}_{n-1}$$

in accordance with the residual error observed at the preceding signaling instant and which corresponds to that combination of phase changes.

Exemplary embodiments of the phase detection apparatus of the present invention will now be described with reference to FIGS. 3 to 5.

FIG. 3 — CASE "A"

A first embodiment of the phase detector of the invention which embodiment is used to implement the inventive method in Case A, with identification of the two phases of the constellation which are closest to the received phase, will next be described. The transmission system employed will be assumed to use a coherent 4-phase PSK modulation technique.

The phase transmitted at each signaling instant can assume one of the four phases of the constellation which will be written $$\phi^l \text{ for } l = 0, 1, 2, 3$$

with, for example, $$\phi^l = 0, \pi/2, \pi, \text{ and } 3\pi/2$$

The phases received and transmitted at instant nT will be designated $\psi_n$ and $\phi_n$, respectively.

The phase change $(\phi_{n-1} - \phi_n)$ can assume one of four distinct values $$\phi_{n-1} - \phi_n = 0, \pi/2, \pi, \text{ and } 3\pi/2.$$

The phase error can also assume the distinct values $$\epsilon_n(\phi_{n-1} - \phi^l) \text{ for } l = 0, 1, 2, 3$$

For clarity, these may be written $$\epsilon_n(0), \epsilon_n(\pi/2), \epsilon_n(\pi) \text{ and } \epsilon_n(3\pi/2)$$

It is assumed that at signaling instant nT the estimated value $\hat{\phi}_{n-1}$ is available along with estimated values of the possible phase errors, or estimated phase errors $$\hat{\epsilon}_n(0), \hat{\epsilon}_n(\pi/2), \hat{\epsilon}_n(\pi), \text{ and } \hat{\epsilon}_n(3\pi/2)$$

Figure 3A:
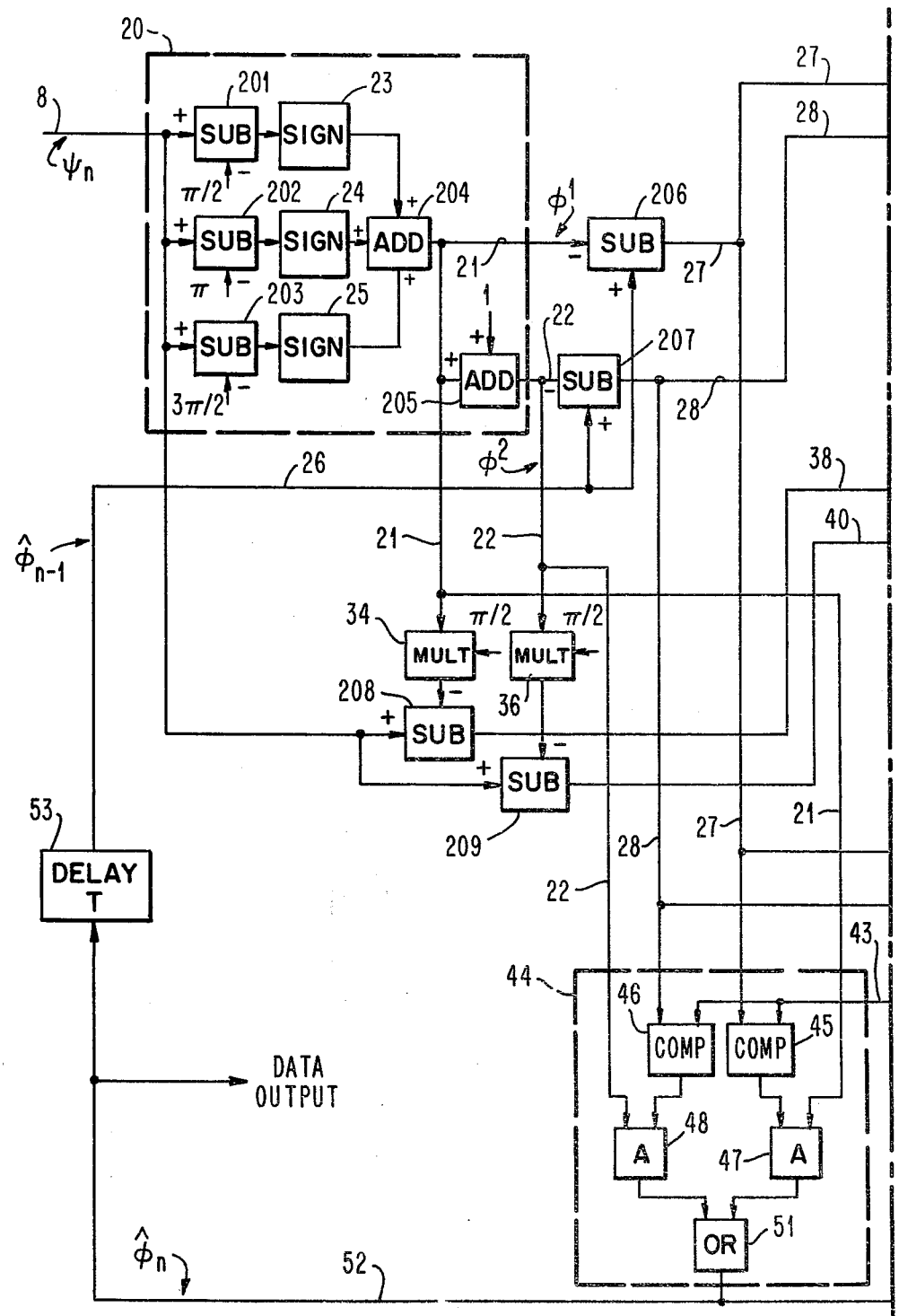
FIGS. 3A and 3B are to be combined.
Figure 3B:
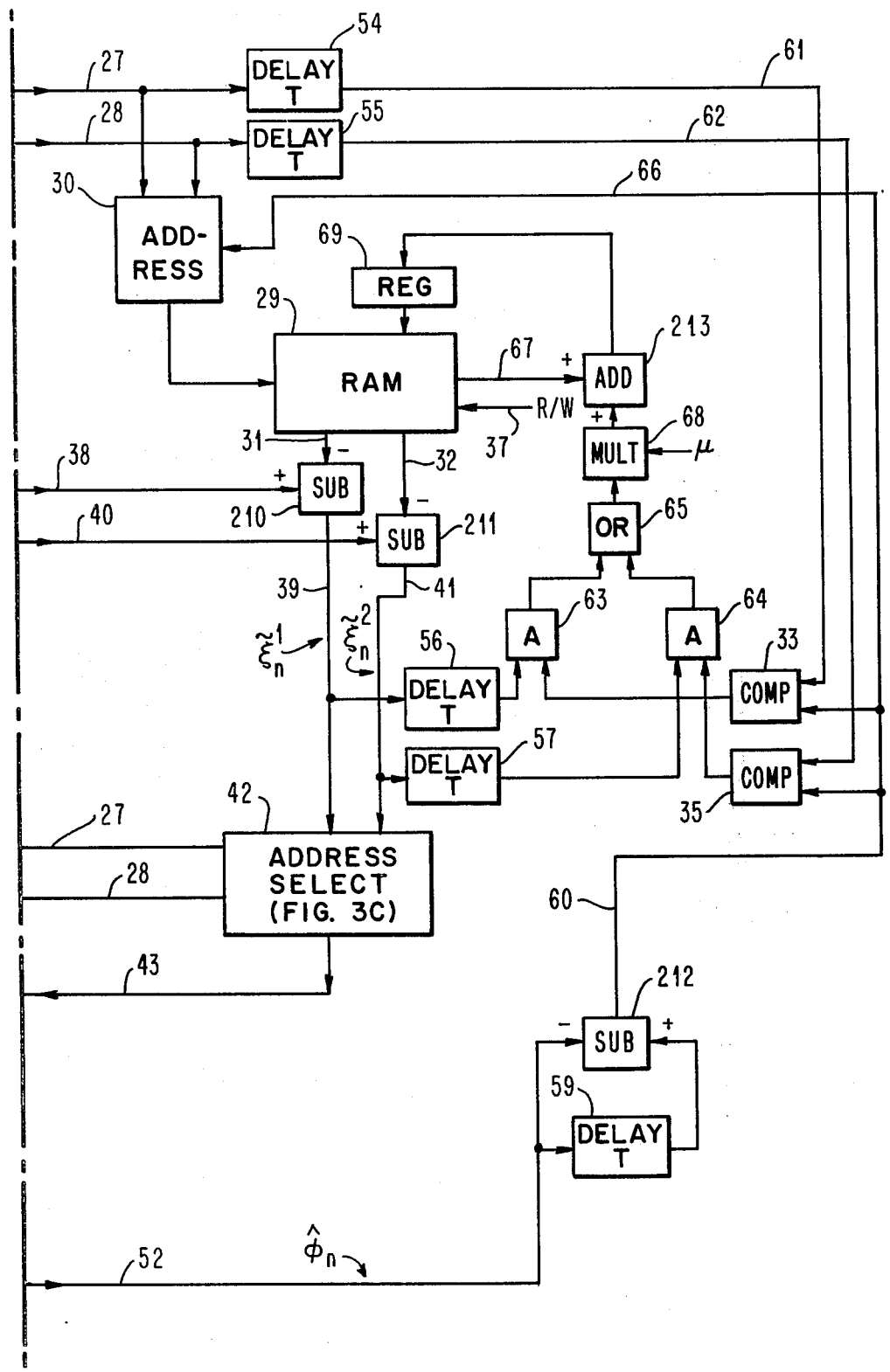

The method of the present invention, as implemented in the apparatus of FIGS. 3A and 3B is as follows:

Step 1

To directly perform the previously described step 1 of Case A, it is necessary to calculate the four residual errors $$\tilde{\epsilon}_n^l = \psi_n - \phi^l - \hat{\epsilon}_n(\hat{\phi}_{n-1} - \phi^l) \text{ for } l = 0, 1, 2, 3. \quad (13)$$

In practice, this first step may be split into two substeps as follows:

Step 1-1

This step consists in selecting those phases of the constellation which are closest to received phase $\psi_n$, said two phases being designated $\phi^1$ and $\phi^2$.

Step 1-2

This step consists in calculating the two residual errors $$\tilde{\epsilon}_n^1 = \psi_n - \phi^1 - \hat{\epsilon}_n(\hat{\phi}_{n-1} - \phi^1) \quad (14)$$

$$\tilde{\epsilon}_n^2 = \psi_n - \phi^2 - \hat{\epsilon}_n(\hat{\phi}_{n-1} - \phi^2) \quad (15)$$

Step 2

This step consists in selecting as phase $\hat{\phi}_n$ whichever of phases $\phi^1$ and $\phi^2$ yields the smallest of the two residual errors so calculated.

Step 3

A new estimated value of one of the four possible phase errors is obtained in accordance with expression (6) which may be written:

$$\hat{\epsilon}_{n+1}(\hat{\phi}_{n-1} - \hat{\phi}_n) = \hat{\epsilon}_n(\hat{\phi}_{n-1} - \hat{\phi}_n) + \mu \tilde{\epsilon}_n^i \quad (16)$$

where
$$\tilde{\epsilon}_n^i = \tilde{\epsilon}_n^1 \text{ if } \hat{\phi}_n = \phi^1$$
$$\tilde{\epsilon}_n^i = \tilde{\epsilon}_n^2 \text{ if } \hat{\phi}_n = \phi^2$$

The other estimated values of the possible phase errors remain unchanged.

For example, if $\hat{\phi}_n = \phi^1 = 0$ and $\hat{\phi}_{n-1} = \pi/2$, we get $$\hat{\epsilon}_{n+1}(\pi/2) = \hat{\epsilon}_n(\pi/2) + \mu \tilde{\epsilon}_n^1$$

$$\hat{\epsilon}_{n+1}(\pi) = \hat{\epsilon}_n(\pi)$$

$$\hat{\epsilon}_{n+1}(3\pi/2) = \hat{\epsilon}_n(3\pi/2)$$

$$\hat{\epsilon}_{n+1}(0) = \hat{\epsilon}_n(0)$$

The estimated values $\hat{\epsilon}_{n+1}(0)$, $\hat{\epsilon}_{n+1}(\pi/2)$, $\hat{\epsilon}_{n+1}(\pi)$ and $\hat{\epsilon}_{n+1}(3\pi/2)$ will be used at the next signaling instant to detect $\hat{\phi}_{n+1}$.

The apparatus shown in FIGS. 3A and 3B which uses the above method will now be described.

Detection of $\hat{\phi}_n$ (Steps 1 and 2)

The received phase $\psi_n$, as supplied by the resolver 7 (FIG. 2), is fed via line 8 to a selection logic 20 which provides on lines 21 and 22, those phases $\phi^1$ and $\phi^2$ of the constellation which are closest to $\psi_n$. In this example, the constellation comprises four phases, namely, 0, $\pi/2$, $\pi$ and $3\pi/2$, to which are associated the following couples of bits, or dibits:

| Phase | Code |
|---|---|
| 0 | 00 |
| $\pi/2$ | 01 |
| $\pi$ | 10 |
| $3\pi/2$ | 11 |

Selection logic 20 provides phases $\phi^1$ and $\phi^2$ by determining the signs of quantities $\psi_n - \pi/2$, $\psi_n - \pi$, and $\psi_n - 3\pi/2$.

To this end, phase $\psi_n$ present on line 8 is applied in parallel to the additive inputs of three binary subtractors 201, 202 and 203 whose subtractive inputs receive the binary coded quantities $\pi/2$, $\pi$ and $3\pi/2$, respectively. The outputs of subtractors 201, 202 and 203 are respectively connected to the inputs of three sign detectors 23, 24 and 25 which respectively supply the sign of quantities $\psi_n - \pi/2$, $\psi_n - \pi$ and $\psi_n - 3\pi/2$. Sign detectors 23, 24 and 25 supply a 0 bit if they receive a negative input and a 1 bit if the input is positive. The outputs of sign detectors 23, 24, and 25 are added up by a two-bit binary adder 204 whose output provides the two bits representing the coded value of $\phi^1$ on line 21. Phase $\phi^2$ is obtained by means of a modulo-4 addition of 1 to the coded value of $\phi^1$ in the two-bit adder 205. The output of adder 205 is connected to line 22. In this way, selection logic 20 performs step 1—1 of the method.

Step 1-2 of the method requires that the residual errors $\hat{\epsilon}_n^1$ and $\hat{\epsilon}_n^2$ defined by expressions (14) and (15) be calculated. To this end, the estimated phase errors $\hat{\epsilon}_n(\hat{\phi}_{n-1} - \phi^1)$ and $\hat{\epsilon}_n(\hat{\phi}_{n-1} - \phi^2)$ must first be determined. The phase changes to be considered in order to determine phase errors $\hat{\epsilon}_n(\hat{\phi}_{n-1} - \phi^1)$ and $\hat{\epsilon}_n(\hat{\phi}_{n-1} - \phi^2)$ are $\hat{\phi}_{n-1} - \phi^1$ and $\hat{\phi}_{n-1} - \phi^2$. To calculate these, phase $\phi^1$ is applied via line 21 to the subtractive input of a two-bit binary subtractor 206 whose additive input receives over line 26, the two bits representing the coded value of phase $\hat{\phi}_{n-1}$. Phase change $\hat{\phi}_{n-1} - \phi^1$ is supplied by subtractor 206 on line 27. Similarly, phase $\phi^2$ is applied via line 22 to the subtractive input of a two-bit binary subtractor 207 whose additive input receives phase $\hat{\phi}_{n-1}$ via line 26. Phase change $\hat{\phi}_{n-1} - \phi^2$ is supplied by subtractor 207 on line 28. The coded phase changes $\hat{\phi}_{n-1} - \phi^1$ and $\hat{\phi}_{n-1} - \phi^2$ on lines 27 and 28 represent the addresses of the two estimated phase errors $\epsilon_n(\hat{\phi}_{n-1} - \phi^1)$ and $\epsilon_n(\hat{\phi}_{n-1} - \phi^2)$ stored in a 4-position random-access memory (RAM) 29, FIG. 3B. The phase changes $\hat{\phi}_{n-1} - \phi^1$ and $\hat{\phi}_{n-1} - \phi^2$ on lines 27 and 28, are fed to an addressing circuit 30 which controls the addressing of RAM 29. It will be understood by those skilled in the art, that circuit 30 will sequentially gate the two addresses available on lines 27 and 28. The estimated phase errors $\hat{\epsilon}_n(\hat{\phi}_{n-1} - \phi^1)$ and $\hat{\epsilon}_n(\hat{\phi}_{n-1} - \phi^2)$ read out of memory 29 are available on lines 31 and 32. For clarity, the output register of memory 29 has not been shown in FIG. 3B, but those skilled in the art will understand that the two estimated phase errors are successively read out of the memory and are stored in such a register and will then be simultaneously available on lines 31 and 32.

Expressions (14) and (15) require that quantities $\psi_n - \phi^1$ and $\psi_n - \phi^2$ be calculated. To this end, FIG. 3A, phases $\phi^1$ and $\phi^2$ available in coded form on lines 21 and 22 are converted into radians by multiplying each of the phases by $\pi/2$. Phase $\phi^1$ is applied via line 21 to one of the two inputs of a multiplier 34 the other input of which receives the quantity $\pi/2$. Phase $\phi^2$ is applied via line 22 to one of the two inputs of a multiplier 36 the other input of which receives the quantity $\pi/2$. It should be noted that since phases $\phi^1$ and $\phi^2$ are each defined by two bits, the multiplications can be replaced by two additions or by a table look-up operation. The quantity $\psi_n - \phi^1$ is calculated by subtractor 208 whose subtractive input is connected to the output of multiplier 34 and whose additive input receives phase $\psi_n$ via line 8. The quantity $\psi_n - \phi^2$ is calculated by subtractor 209 whose subtractive input is connected to the output of multiplier 36 and whose additive input receives phase $\psi_n$ via line 8. The quantity $\psi_n - \phi^1$ available at the output of subtractor 208 is applied over a line 38 to the additive input, FIG. 3B, of a subtractor 208 whose subtractive input receives, via line 31, the estimated value $\hat{\epsilon}_n(\hat{\phi}_{n-1} - \phi^1)$ read out of memory 29. Subtractor 210 supplies on its output line 39 the residual error $\epsilon_n^1$ defined by expression (14). The quantity $\psi_n - \phi^2$, available at the output of subtractor 210, FIG. 3A, is applied via line 40 to the additive input of a subtractor 211 whose subtractive input receives, via line 32, the estimated value $\hat{\epsilon}_n(\hat{\phi}_{n-1} - \phi^2)$ read out of memory 29. Subtractor 211 supplies, on line 41, the residual error $\hat{\epsilon}_n^2$ defined by expression (15). Subtractors 206-211, addressing circuit 30 and memory 29 serve to perform step 1-2 of the inventive method.

Step 2 of the present method involves comparing residual errors $\hat{\epsilon}_n^1$ and $\hat{\epsilon}_n^2$ and selecting the one of phases $\phi^1$ and $\phi^2$ which yields the smaller of these two residual errors. The two residual errors are fed via lines 39 and 41 to an address selection circuit 42 which selects the address corresponding to the residual error with the smaller absolute value. A first exemplary embodiment of address selection circuit 42 is shown in FIG. 3C, which will be described later. This address, which is the phase change $\hat{\phi}_{n-1} - \hat{\phi}_n$, is available on the output line 43 of selection circuit 42. The phase change $\hat{\phi}_{n-1} - \hat{\phi}_n$ present on line 43 is compared with phase changes $\hat{\phi}_{n-1} - \phi^1$ and $\hat{\phi}_{n-1} - \phi^2$, respectively available on lines 27 and 28, FIG. 3A, in the comparison and selection circuit 44 which supplies phase $\hat{\phi}_n$. The value of this phase is $$\hat{\phi}_n = \phi^1 \text{ if } \hat{\phi}_{n-1} - \hat{\phi}_n = \hat{\phi}_{n-1} - \phi^1$$

and $$\hat{\phi}_n = \phi^2 \text{ if } \hat{\phi}_{n-1} - \hat{\phi}_n = \hat{\phi}_{n-1} - \phi^2$$

In circuit 44, phase change $\hat{\phi}_{n-1} - \hat{\phi}_n$ is applied in parallel via line 43 to a first input of each of two comparators 45 and 46 whose second inputs receive phase changes $\hat{\phi}_{n-1} - \phi^1$ and $\hat{\phi}_{n-1} - \phi^2$ respectively from lines 27 and 28.

Comparators 45 and 46 generate a 1 bit when the quantities being compared are equal. The outputs of these comparators are respectively applied to a first input of an associated one of two AND gates 47 and 48 whose second inputs receive phases $100^1$ and $\phi^2$, respectively, via lines 21 and 22. The outputs of AND gates 47 and 48 are applied to the inputs of an OR gate 51 which supplies a 2-bit output representing the coded value of phase $\hat{\phi}_n$. The output of OR gate 51 is connected via line 52 to the data output line of the detection apparatus of the present invention. Phase $\hat{\phi}_n$ is also applied via line 52 to the input of a delay element 53 which introduces a T-second delay and provides phases $\hat{\phi}_{n-1}$ on line 26.

Adaptive Determination (Step 3)

The adaptive manner in which the estimated phase errors are determined in accordance with expression (16) will now be described. Quantities $\hat{\phi}_{n-1} - \phi^1$, $\hat{\phi}_{n-1} - \phi^2$, $\hat{\epsilon}_n^1$ and $\hat{\epsilon}_n^2$ are respectively stored in delay elements 54, 55, 56 and 57 during the period when the detection of $\hat{\phi}_n$ is taking place. The estimated phase error to be adjusted is that which corresponds to phase change $\hat{\phi}_{n-1} - \hat{\phi}_n$. The address of this phase change, which is in fact its value, is calculated by subtractor 212 whose subtractive and additive inputs respectively receive applied phase $\hat{\phi}_n$ via line 52 and phase $\hat{\phi}_{n-1}$ obtained by delaying prior phase $\hat{\phi}_{n-1}$ by means of delay element 59. The phase change $\hat{\phi}_{n-1} - \hat{\phi}_n$ supplied by subtractor 212 on output line 60 is compared with phase changes $\hat{\phi}_{n-1} - \phi^1$ and $\hat{\phi}_{n-1} - \phi^2$ respectively available on the output lines 61 and 62 of delay elements 54 and 55. Phase change $\hat{\phi}_{n-1} - \hat{\phi}_n$ is compared with $\hat{\phi}_{n-1} - \phi^1$ in comparator 33 and with $\hat{\phi}_{n-1} - \phi^2$ in comparator 35. Comparators 33 and 35 are identical with comparators 45 and 46, FIG. 3A. The outputs of comparator 33 and delay element 56 are fed as inputs to an AND gate 63, while the outputs of comparator 35 and delay element 57 are fed as inputs to an AND gate 64. The outputs of AND gates 63 and 64 are in turn fed to an OR gate 65. If $\hat{\phi}_{n-1} - \hat{\phi}_n = \hat{\phi}_{n-1} - \phi^1$ the residual error $\tilde{\epsilon}_n{}^1$ from AND 63 will be obtained at the output of OR 65; if $\hat{\phi}_{n-1} - \hat{\phi}_n = \hat{\phi}_{n-1} - \phi^2$, residual error $\tilde{\epsilon}_n{}^2$ from AND 64 will be obtained. Phase change $\hat{\phi}_{n-1} - \hat{\phi}_n$ from subtractor 212 is additionally supplied via line 66 to the addressing circuit 30 of memory 29, thereby causing the estimated phase error $\hat{\epsilon}_n (\hat{\phi}_{n-1} - \hat{\phi}_n)$ to be read out of the memory. This estimated phase error is made available on line 67 and applied to one input of an adder 213. The residual error $\tilde{\epsilon}_n{}^i$ available at the output of OR gate 65 is multiplied by the constant $\mu$ in multiplier 68 and applied to the other input of adder 213. In this example, a value of $\mu = 1/16$ or 1/32 is satisfactory and the multiplication operation is reduced to a right shift of four or five bit positions. An updated value of the estimated phase error, $\hat{\epsilon}_{n+1}(\hat{\phi}_{n-1} - \hat{\phi}_n)$, is obtained at the output of adder 213. This new value is entered into memory 29 through input register 69 and is stored at the address $\hat{\phi}_{n-1} - \hat{\phi}_n$ under control of the read/write (R/W) line 37. The detection of phase $\hat{\phi}_{n+1}$ can then take place at instant (n+1)T.

An exemplary embodiment of the address selection circuit 42 will now be described with reference to FIG. 3C. The residual errors $\tilde{\epsilon}_n{}^1$ and $\tilde{\epsilon}_n{}^2$ respectively available on output lines 39 and 41 of subtractors 210 and 211 are respectively fed to circuits 70 and 71 which supply the absolute values of such errors. These circuits simply consist of registers in which the sign bit is masked. The absolute value $\tilde{\epsilon}_n{}^2$ supplied by circuit 71 is subtracted by subtractor 214 from the absolute value $\tilde{\epsilon}_n{}^1$ supplied by circuit 70, and the sign of the difference is detected by a sign detector 72 which generates a 0 bit if the difference is negative and a 1 bit if it is positive. The output of sign detector 72 is directly applied to an input of an AND gate 73 and through an inverter 74 to an input of AND gate 75. The phase change $\hat{\phi}_{n-1} - \phi^2$ available at the output of subtractor 207 is applied to the other input of AND gate 73 and the phase change $\hat{\phi}_{n-1} - \phi^1$ available at the output of subtractor 206 is applied to the other input of AND gate 75. The outputs of AND gates 73 and 75 are inputs to an OR gate 76 whose output on line 43 provides the address corresponding to the smaller of the residual errors $\tilde{\epsilon}_n{}^1$ and $\tilde{\epsilon}_n{}^2$.

FIG. 4 — CASE "B"

Figure 4A:
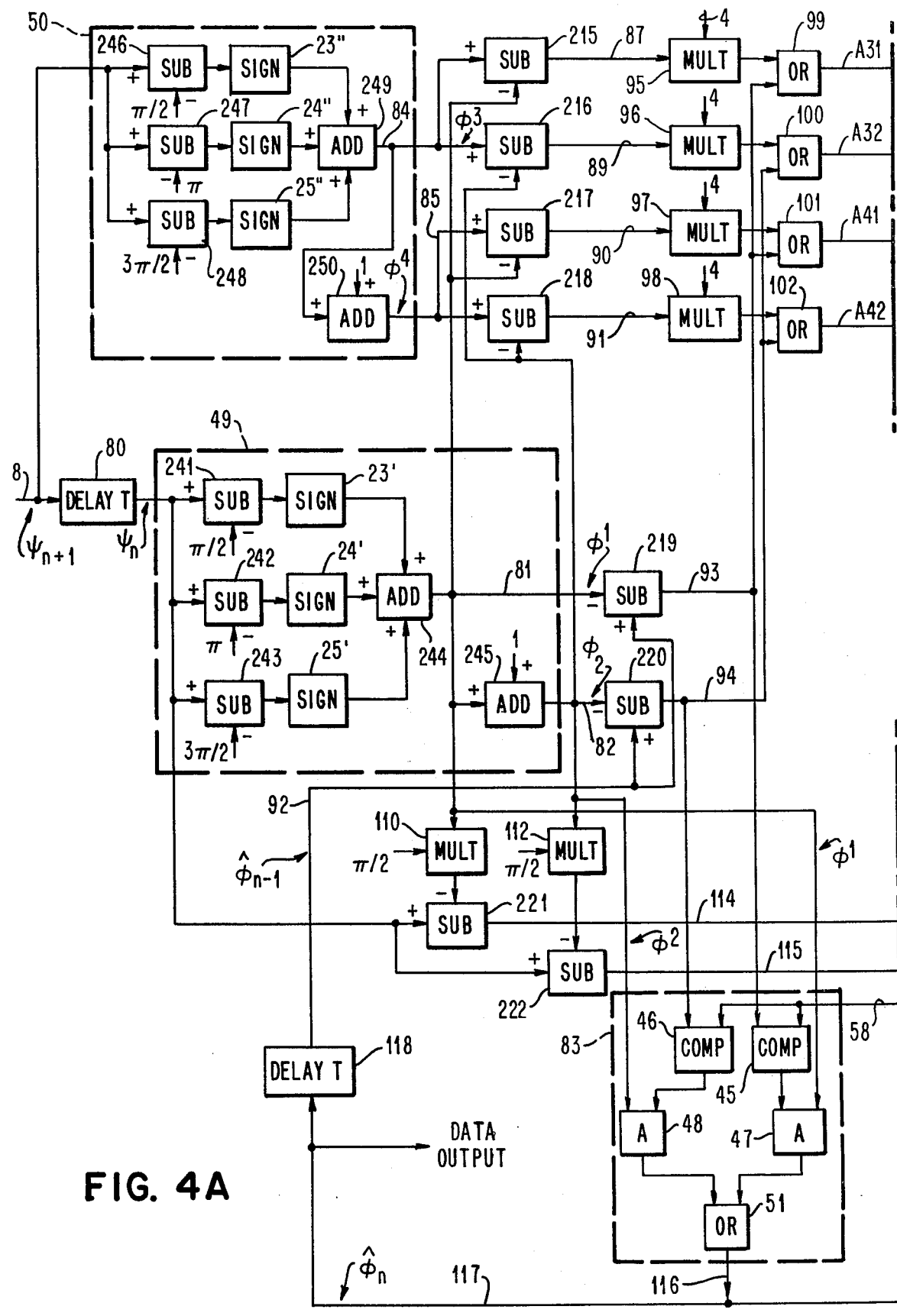
FIGS. 4A and 4B are to be combined.
Figure 4B:
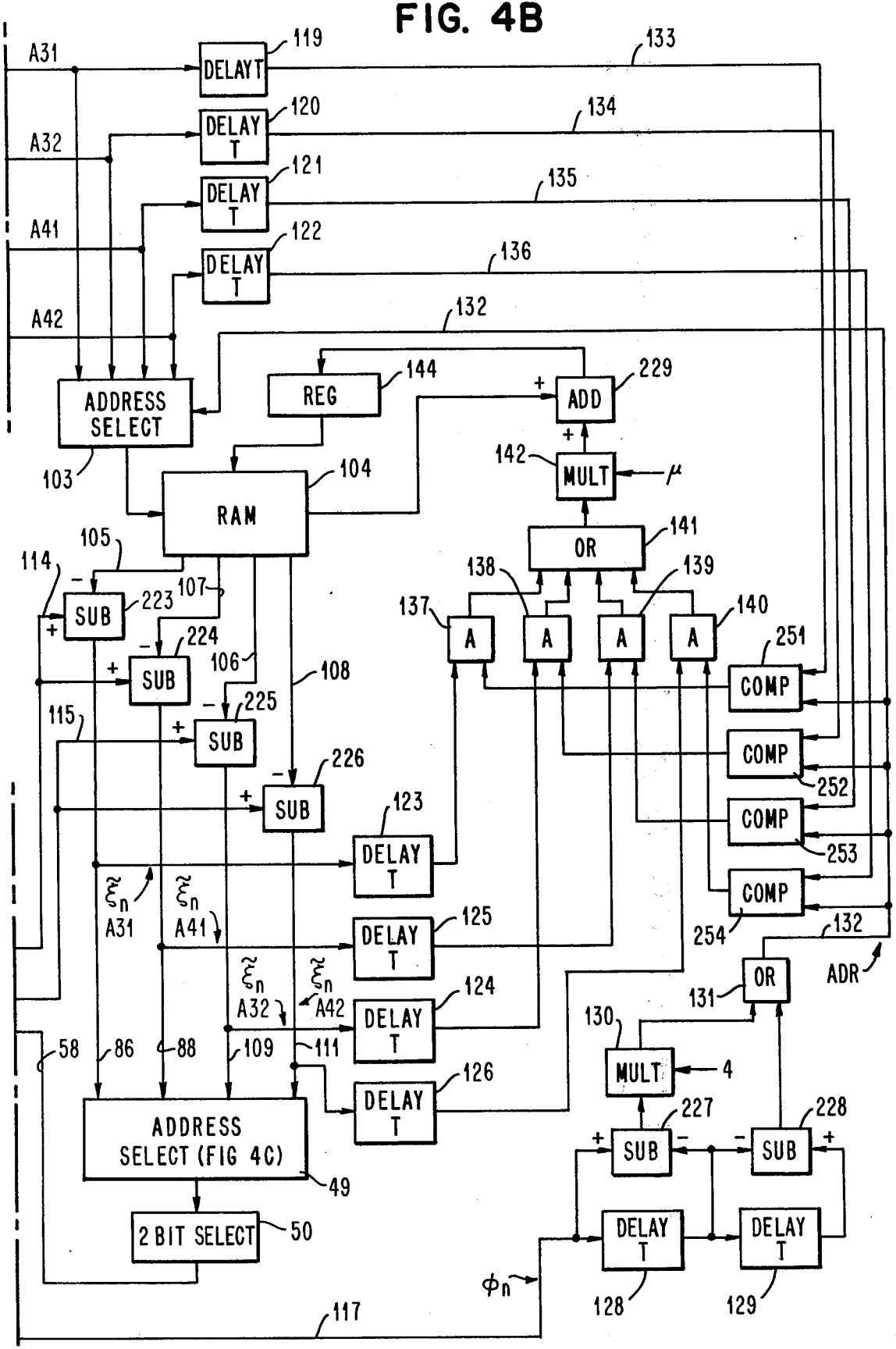

FIGS. 4A and 4B combined illustrate an exemplary embodiment of the phase detector of the present invention which serves to implement the method as used in Case B, with identification of the two phases of the constellation which are closest to received phases $\psi_n$ and $\psi_{n+1}$. The transmission system employed will be assumed to use the same 4-phase PSK modulation technique as in Case A with a constellation $$\phi^l \text{ for } l = 0, 1, 2, 3$$

with for example, $$\phi^l = 0, \pi/2, \pi, 3\pi/2$$

Phase changes $\phi_{n+1} - \phi_n$ and $\phi_{n-1} - \phi_n$ can assume the following values:

$$\phi_{n+1} - \phi_n = 0, \pi/2, \pi, 3\pi/2$$

$$\phi_{n-1} - \phi_n = 0, \pi/2, \pi, 3\pi/2$$

The phase error $\epsilon_n$ which alters received phase $\psi_n$ is dependent upon phase changes $\phi_{n+1} - \phi_n$ and $\phi_{n-1} - \phi_n$. Phase error $\epsilon_n$ will, therefore, be written $$\epsilon_n = \theta_n(\phi_{n+1} - \phi_n, \phi_{n-1} - \phi_n)$$

Since phase changes $\phi_{n+1} - \phi_n$ and $\phi_{n-1} - \phi_n$ can take on four distinct values each, the phase error can assume sixteen distinct values.

In contradistinction to Case A, the detection of phase $\phi_n$ must take place at instant (n+1)T in Case B since it is necessary that received phases $\psi_n$ and $\psi_{n+1}$ be known. It will be assumed that the estimated value $\hat{\phi}_{n-1}$ and the sixteen estimated values $\hat{\theta}_n(\phi_{n+1} - \phi_n, \phi_{n-1} - \phi_n)$ are available.

The method of the present invention, as implemented in the apparatus of combined FIG. 4A and 4B, is as follows:

Step 1

To directly perform the previously described step 1 of Case B, it is necessary to calculate the sixteen residual errors $$\tilde{\epsilon}_n{}^{jl} = \psi_n - \phi^l - \hat{\theta}_n(\phi^l - \phi^l, \hat{\phi}_{n-1} - \phi^l) \text{ for } j, l = 0, 1, 2, 3 \quad (17)$$

where $\phi^j$ also represents the four phases of the constellation.

In practice, this step may be split into two sub-steps as follows:

Step 1-1

This consists in selecting the two phases of the constellation which are closest to received phase $\psi_n$, these two phases being designated $\phi^1$ and $\phi^2$, and the two phases of the constellation which are closest to phase $\psi_{n+1}$ of the succeeding signal, these latter phases being designated $\phi^3$ and $\phi^4$.

Step 1-2

This consists in calculating the four residual errors $$\tilde{\epsilon}_n{}^{31} = \psi_n - \phi^1 - \hat{\theta}_n(\phi^3 - \phi^1, \hat{\phi}_{n-1} - \phi^1) \quad (18)$$

$$\tilde{\epsilon}_n{}^{32} = \psi_n - \phi^2 - \hat{\theta}_n(\phi^3 - \phi^2, \hat{\phi}_{n-1} - \phi^2) \quad (19)$$

$$\tilde{\epsilon}_n{}^{41} = \psi_n - \phi^1 - \hat{\theta}_n(\phi^4 - \phi^1, \hat{\phi}_{n-1} - \phi^1) \quad (20)$$

$$\tilde{\epsilon}_n{}^{42} = \psi_n - \phi^2 - \hat{\theta}_n(\phi^4 - \phi^2, \hat{\phi}_{n-1} - \phi^2) \quad (21)$$

Step 2

If the smallest residual error is $\tilde{\epsilon}_n{}^{31}$ or $\tilde{\epsilon}_n{}^{41}$, then $\hat{\phi}_n = \phi^1$.

If the smallest residual error is $\tilde{\epsilon}_n{}^{32}$ or $\tilde{\epsilon}_n{}^{42}$, then $\hat{\phi}_n = \phi^2$.

Step 3

A new estimated value of the phase error is obtained in accordance with the relation:

$$\hat{\theta}_{n+1}(\hat{\phi}_n - \hat{\phi}_{n-1}, \hat{\phi}_{n-2} - \hat{\phi}_{n-1}) = \hat{\theta}_n(\hat{\phi}_n - \hat{\phi}_{n-1}, \hat{\phi}_{n-2} - \hat{\phi}_{n-1}) + \mu \tilde{\epsilon}_{n-1} \quad (22)$$

where $\tilde{\epsilon}_{n-1}$ is the residual error observed at the preceding signaling instant and which corresponds to the combination of phase changes $\hat{\phi}_n - \hat{\phi}_{n-1}, \hat{\phi}_{n-2} - \hat{\phi}_{n-1}$ The other estimated phase errors remain unchanged.

The apparatus shown in FIG. 4 which is used to implement the above method will now be described.

Detection of $\hat{\phi}_n$ (Steps 1 and 2)

As has been mentioned, the detection of $\hat{\phi}_n$ takes place at the instant $(n+1)T$ when phase $\psi_{n+1}$ of the succeeding signal is determined. The value of phase $\psi_{n+1}$ is inputted via line 8 to a delay element 80 which introduces a delay of T seconds. The phase $\psi_n$ of the signal being detected is available at the output of delay element 80 and is an input to a selection logic 49 which is similar to the previously described selection logic 20 of FIG. 3A and which supplies on lines 81 and 82, the phases $\phi^1$ and $\phi^2$ of the constellation that are closest to phase $\psi_n$. Phase $\psi_{n+1}$ present on line 8 is also an input of a selection logic 50 which is identical with logics 20 and 49 and which provides on lines 84 and 85 the phases $\phi^3$ and $\phi^4$ of the constellation that are closest to phase $\psi_{n+1}$. Phases $\phi^1$, $\phi^2$, $\phi^3$, and $\phi^4$, are coded using the same code as in Case A. Selection logics 49 and 50 serve to perform step 1-1 of the subject method.

Step 1-2 of the method calls for the calculation of the residual errors $\tilde{\epsilon}_n^{31}, \tilde{\epsilon}_n^{32}, \tilde{\epsilon}_n^{41}$, and $\tilde{\epsilon}_n^{42}$ defined by relations (18) to (21).

The six phase changes $\phi^3 - \phi^1, \phi^4 - \phi^1, \phi^3 - \phi^2, \phi^4 - \phi^2, \hat{\phi}_{n-1} - \phi^1$
and $\hat{\phi}_{n-1} - \phi^2$ must first be determined. Each of these phase changes is represented by two bits and is readily obtained by means of a modulo-4 calculation of the phase differences, this being carried out by the six two-bit subtractors 215 to 220 inclusive, FIG. 14A. Phase $\phi^3$ present on line 84 is applied to the additive input of subtractor 215 while phase $\phi^1$ is applied to the subtractive input thereof via line 81. Phase change $\phi^3 - \phi^1$ is obtained on output line 87 of subtractor 215. Phase $\phi^3$ present on line 84 is also applied to the additive input of subtractor 216 while phase $\phi^2$ is applied to the subtractive input thereof via line 82. Phase change $\phi^3 - \phi^2$ is provided on output line 89 of subtractor 216. Phase $\phi^4$ present on line 85 is applied to the additive input of subtractor 217 while phase $\phi^1$ is applied to the subtractive input thereof via line 81. Phase change $\phi^4 - \phi^1$ is obtained on output line 90 of subtractor 217. Phase $\phi^4$ is also applied to the additive input of subtractor 218 while phase $\phi^2$ is applied to the subtractive input thereof via line 82. Phase change $\phi^4 - \phi^2$ is available on output line 91 of subtractor 218. Phase $\phi^1$ present on line 81 is also applied to the subtractive input of subtractor 219 whose additive input receives phase $\hat{\phi}_{n-1}$ available on a line 92. Phase change $\hat{\phi}_{n-1} - \phi^1$ is then available on output line 93 of subtractor 219. Phase $\phi^2$ present on line 82 is also applied to the subtractive input of subtractor 220 while phase $\hat{\phi}_{n-1}$ is applied to the additive input thereof from line 92. Phase change $\hat{\phi}_{n-1} - \phi^2$ is available on output line 94 of subtractor 220. The outputs of subtractors 215 to 218 are multiplied by four (i.e., a shift of two bit positions to the left) in multipliers 95-98, respectively. The outputs of multipliers 95 and 97 are concatenated with the output of subtractor 219 by OR circuits 99 and 101, respectively. The outputs of multipliers 96 and 98 are concatenated with the output of subtractor 220 by OR circuits 100 and 102, respectively. There are thus obtained at the outputs of the four OR circuits 99-102, four 4-bit words designated A31, A32, A41 and A42 that respectively correspond to the following combinations of phase changes.

A31 : $\phi^3 - \phi^1, \hat{\phi}_{n-1} - \phi^1$
A32 : $\phi^3 - \phi^2, \hat{\phi}_{n-1} - \phi^2$
A41 : $\phi^4 - \phi^1, \hat{\phi}_{n-1} - \phi^1$
A42 : $\phi^4 - \phi^2, \hat{\phi}_{n-1} - \phi^2$ These four words will represent the addresses of the four estimated phase errors stored in a memory, which errors correspond to these phase change combinations and are to be used to calculate the residual errors. Addresses A31, A32, A41 and A42, respectively available at the output of OR circuits 99-102, are inputs to an addressing circuit 103, see FIG. 4B, which controls the addressing of a random-access memory 104. Memory 104 is a 16-location random-access memory (RAM) that permits storing the sixteen possible estimated values of the phase error. Those skilled in the art will appreciate that the four addresses A31, A32, A41 and A42 will be sequentially transmitted by circuit 103 to RAM 104. The four estimated phase errors read out of memory 104 will be written $\hat{\theta}_n(A31), \hat{\theta}_n(A32), \hat{\theta}_n(A41)$ and $\hat{\theta}_n(A42)$ These four estimated phase errors are respectively available on lines 105 to 108. For clarity, the output register of memory 104 has not been shown in the figure, but it will be understood by those skilled in the art that these four errors are successively read out of the memory 104 and are stored in the memory's output register to be simultaneously provided on output lines 105 to 108.

In order to calculate the four residual errors defined by relations (18) to (21), it is necessary to calculate the phase differences $\psi_n - \phi^1$ and $\psi_n - \phi^2$. To this end, phases $\phi^1$ and $\phi^2$ available in coded form are converted into radians by multiplying same by $\pi/2$. Phase $\phi^1$ present in coded form on line 81, FIG. 4A, is applied to one of the two inputs of a multiplier 110 whose other input receives the quantity $\pi/2$. Similarly, phase $\phi^2$ present on line 82 is applied to one of the two inputs of a multiplier 112 whose other input also receives the quantity $\pi/2$. Note that since phases $\phi^1$ and $\phi^2$ are coded by means of two bits each, the multiplications can be replaced by two additions or by a simple table look-up operation. The quantity $\psi_n - \phi^1$ is calculated by subtractor 221 whose subtractive input is connected to the output of multiplier 110 and whose additive input receives phase $\psi_n$ via line 113 from delay 80. The quantity $\psi_n - \phi^2$ is calculated by subtractor 222 whose subtractive input is connected to the output of multiplier 112 and whose additive input receives phase $\psi_n$ from line 113. The output of subtractor 221 is connected via line 114 to additive inputs of both subtractors 223 and 224, FIG. 4B, whose subtractive inputs are respectively connected to lines 105 and 107. Similarly, the output of subtractor 222, FIG. 4A, is connected via line 115 to the additive inputs of subtractors 225 and 226, FIG. 4B, whose subtractive inputs are respectively connected to lines 106 and 108. The four residual errors noted below are respectively obtained at the outputs of subtractors 223 to 226 inclusive:

$\tilde{\epsilon}_n(A31) = \psi_n - \phi^1 - \hat{\theta}_n(A31)$ $\tilde{\epsilon}_n(A41) = \psi_n - \phi^1 - \hat{\theta}_n(A41)$ $$\tilde{\epsilon}_n(A32) = \psi_n - \phi^2 - \hat{\theta}_n(A32)$$

$$\tilde{\epsilon}_n(A42) = \psi_n - \phi^2 - \hat{\theta}_n(A42)$$

Step 2 of the method of this embodiment of the invention involves comparing the residual errors thus obtained and selecting whichever of phases $\phi^1$ and $\phi^2$ yields the smaller residual error. These four residual errors are fed via lines 86, 88, 109 and 111 to a selection circuit 49 which selects the address corresponding to the smallest residual error. An exemplary embodiment of circuit 49 is illustrated in FIG. 4C. The word comprised of the two least significant bits (LSB) of the address of the smallest error represents phase change $\hat{\phi}_{n-1} - \hat{\phi}_n$. The selection of the two least significant bits takes place in block 50 designated LSB and connected to the output of selection circuit 49. The phase change $\hat{\phi}_{n-1} - \hat{\phi}_n$ present on output line 58 of selection block 50 is compared with phase shifts $\hat{\phi}_{n-1} - \phi^1$ and $\hat{\phi}_{n-1} - \phi^2$, respectively available on lines 93 and 94, see FIG. 4A, in the comparison and selection circuit 83 which is identical with the comparison and selection circuit 44 of FIG. 3A and supplies phase $\hat{\phi}_n$ on its output line 116. The value of $\hat{\phi}_n$ is $$\hat{\phi}_n = \hat{\phi}^1 \text{ if } \hat{\phi}_{n-1} - \hat{\phi}_n = \hat{\phi}_{n-1} - \phi^1$$

$$\hat{\phi}_n = \hat{\phi}^2 \text{ if } \hat{\phi}_{n-1} - \hat{\phi}_n = \hat{\phi}_{n-1} - \phi^2$$

Phase $\hat{\phi}_n$ is applied via line 117 to the data output of the detector of the invention, and to a delay element 118 which introduces a delay of T seconds and supplies phase $\hat{\phi}_{n-1}$ on the above-mentioned output line 92.

Adaptive Determination (Step 3)

The adaptive manner in which the estimated phase errors are determined in accordance with expression (22) will now be described.

The addresses A31, A32, A41 and A42, see FIG. 4B, from ORs 99–102, FIG. 4A, and the corresponding residual errors $\tilde{\epsilon}_n(A31)$, $\tilde{\epsilon}_n(A32)$, $\tilde{\epsilon}_n(A41)$ and $\tilde{\epsilon}_n(A42)$ on lines 105–108 are respectively fed to delay elements 119–126, each of which introduces a T-second delay. The estimated phase error to be adjusted is that which corresponds to the combination of phase changes $\hat{\phi}_n - \hat{\phi}_{n-1}$, $\hat{\phi}_{n-2} - \hat{\phi}_{n-1}$. The address ADR of this estimated phase error is calculated as follows. Phase $\hat{\phi}_n$ is fed via line 117 to a delay element 128 that introduces a T-sec. delay and supplies phase $\hat{\phi}_{n-1}$. Phase $\hat{\phi}_{n-1}$ is subtracted from phase $\hat{\phi}_n$ on line 117 by a modulo-4 subtractor 227. Phase $\hat{\phi}_{n-1}$ from delay 128 is also fed to a delay element 129 that introduces a second T-sec. delay and supplies phase $\hat{\phi}_{n-2}$. Phase $\hat{\phi}_{n-1}$ is subtracted from $\hat{\phi}_{n-2}$ by a modulo-4 subtractor 228. The output of subtractor 227 is multiplied by 4 (two shifts to the left) in a multiplier 130. The output of multiplier 130 and that of subtractor are concatenated by OR circuit 131 which supplies on its output line 132 the 4-bit address ADR corresponding to the combination of phase changes $\hat{\phi}_n - \hat{\phi}_{n-1}$, $\hat{\phi}_{n-2} - \hat{\phi}_{n-1}$. Address ADR is then compared in the set of comparators 251–254 with the addresses A31, A32, A41 and A42 associated with the preceding signaling instant and which are available at the output of delay elements 119–122. To this end, address ADR is applied via line 132 to an input of each of the comparators COMP5–COMP8, the other inputs of which are respectively connected to the outputs of delay elements 119–122 via lines 133–136, respectively. The outputs of comparators 251–254 are respectively fed to one of the two inputs of a set of AND gates 137–140, the other inputs of which are respectively connected to the outputs of delay elements 123–216. All of the outputs of AND gates 137–140 are connected to inputs of an OR gate 141. Thus, one obtains at the output of OR gate 141 the one of the residual errors associated with the preceding signaling instant which corresponds to address ADR. This residual error, which will be written $\tilde{\epsilon}_{n-1}(ADR)$, is multiplied by the constant $\mu$ in multiplier 142. In the example illustrated in the figure, $\mu = 1/16$ or $1/32$ and the multiplication is, in fact, reduced to a shift of four or five bit positions to the right. The quantity $\mu \tilde{\epsilon}_{n-1}(ADR)$ is thus obtained at the output of multiplier 142. Address ADR is also applied via line 132 to the address selecting circuit 103 and causes the corresponding estimated phase error, which will be written $\hat{\theta}_n(ADR)$, to be read out of memory 104 on line 143. Error $\hat{\theta}_n(ADR)$ on line 143 is added to $\mu \tilde{\epsilon}_{n-1}(ADR)$ in adder 229 which thus provides the new estimated phase error $$\hat{\theta}_{n+1}(ADR) = \hat{\theta}_n(ADR) + \mu \tilde{\epsilon}_{n-1}(ADR)$$

This new estimated phase error is entered into RAM 104 through input register 144 at the storage location address fed via line 132 to addressing circuit 103. The detection of phase $\hat{\phi}_{n+1}$ can, therefore, take place at the next signaling instant.

An exemplary embodiment of the address selection circuit 49 of FIG. 4B will now be described with reference to FIG. 4C. The residual errors $\tilde{\epsilon}_n(A31)$ and $\tilde{\epsilon}_n(A41)$ respectively present on output lines 86 and 88 from subtractors 223 and 224 and are each an input to one of two circuits 145 and 146 which provide the absolute values $\tilde{\epsilon}_n(A31)$ and $\tilde{\epsilon}_n(A41)$ of the errors. Absolute value $\tilde{\epsilon}_n(A41)$ is subtracted from absolute value $\tilde{\epsilon}_n(A31)$ in subtractor 240, and the sign of the difference thus obtained is detected by sign detector 147. Detector 147 supplies a 0 bit if the difference is negative and a 1 bit if it is positive. The output of detector 147 is directly applied to one of the inputs of each of 2-input AND gates 148 and 149, and is applied through an inverter 150 to one of the inputs of each of 2-input AND gates 151 and 152. The other input of AND gate 149 is connected to the output of circuit 146 while the other input of AND gate 148 receives address A41 from OR gate 101. The other input of AND gate 151 is connected to the output of circuit 145 while the other input of AND gate 152 receives address A31 from OR gate 99. The outputs of AND gates 148 and 152 are connected to the two inputs of an OR gate 153. The outputs of AND gates 149 and 151 are similarly connected to the two inputs of an OR gate 154. The smaller of the absolute values $\tilde{\epsilon}_n(A31)$ and $\tilde{\epsilon}_n(A41)$ is then obtained at the output of OR gate 154. Address A31 is provided at the output of OR gate 153 if $\tilde{\epsilon}_n(A31) \tilde{\epsilon}_n(A41)$; otherwise, address A41 is obtained.

Residual errors $\tilde{\epsilon}_n(A32)$ and $\tilde{\epsilon}_n(A42)$ are respectively inputted via lines 109 and 111, each to one of a pair of circuits 155 and 156 which supply the absolute values $\tilde{\epsilon}_n(A32)$ and $\tilde{\epsilon}_n(A42)$, respectively. The outputs of circuits 155 and 156 are respectively connected to the additive and subtractive inputs of a subtractor 231 whose output is connected to a sign detector 157. The output of sign detector 157 is directly connected to one of the inputs of each of the two-input AND gates 158 and 159, and is connected through an inverter 160 to one of the inputs of each of the two-input AND gates 161 and 162. The other input of AND gate 159 is connected to the output of circuit 156 while the other input of AND gate 158 receives address A42 from OR gate 102. The other input of AND gate 161 is connected to the output of circuit 155 and the other input of AND gate 162 receives address A32 from OR gate 100. The outputs of AND gates 158 and 162 are connected to the inputs of an OR gate 163 and the outputs of AND gates 159 and 161 are connected to the inputs of an OR gate 164. The smaller of the absolute values $\hat{\epsilon}_n(A32)$ and $\hat{\epsilon}_n(A42)$ is obtained at the output of OR gate 164. One obtains address A32 at the output of OR gate 163 if $\hat{\epsilon}_n(A32) < \hat{\epsilon}_n(A42)$; otherwise, address A42 is obtained. The output of OR gate 164 is subtracted from that of OR gate 154 in subtractor 232 and the sign of the difference thus obtained is detected by sign detector 166. The output of detector 166 is directly connected to one of the two inputs of an AND gate 167, and is connected through an inverter 168 to one of the two inputs of an AND gate 169. The other input of AND gate 167 is connected to the output of OR gate 163, and the other input of AND gate 169 is connected to the output of OR gate 153. The outputs of AND gates 167 and 169 are connected to the inputs of an OR gate 170, which supplies to selector 50, the address corresponding to the smallest residual error.

FIGURE 5 — CASE "C"

FIG. 5 illustrates an exemplary embodiment of the apparatus which may be added to that illustrated in FIGS. 4A and 4B to implement the method of Case C, with a resultant identification of the two phases of the constellation that are closest to $\psi_n$ and $\psi_{n+1}$. The assumptions and notations previously associated with Case B and the apparatus of FIGS. 4A and 4B are equally applicable to Case C.

The phase changes $\phi_{n+1}-\phi_n$, $\phi_{n-1}-\phi_n$, and $\phi_{n-2}-\phi_n$ can assume the following values:

$$\phi_{n+1}-\phi_n = j\,\pi/2 \quad j = 0, 1, 2, 3$$

$$\phi_{n-1}-\phi_n = k\,\pi/2 \quad k = 0, 1, 2, 3$$

$$\phi_{n-2}-\phi_n = s\,\pi/2 \quad s = 0, 1, 2, 3$$

The phase error $\epsilon_n$ which alters received phase $\psi_n$ will be written:

$$\epsilon_n = \theta_n(\phi_{n+1}-\phi_n, \phi_{n-1}-\phi_n) + \chi_n(\phi_{n-2}-\phi_n) \quad (23)$$

As in Case B, the detection of $\hat{\phi}_n$ takes place at instant $(n+1)T$ since both $\psi_n$ and $\psi_{n+1}$ must be known. It is assumed that the estimated values $\hat{\phi}_{n-1}$ and $\hat{\phi}_{n-2}$ are available together with the sixteen estimated values $\hat{\theta}_n$ and the four estimated values $\hat{\chi}_n$. The method of the invention, as implemented in the apparatus of FIG. 4, after incorporation of the apparatus of FIG. 5, is as follows:

Step 1

To directly perform the previously described step 1 of Case C, it is necessary to calculate the residual errors $$\hat{e}_n^{jl} = \psi_n - \phi^l - \hat{\theta}_n(\phi^j-\phi^l, \hat{\phi}_{n-1}-\phi^l) - \hat{\chi}_n(\hat{\phi}_{n-2}-\phi^l) \text{ for } j, l = 0, 1, 2, 3.$$

In practice, this step may be split into two sub-steps as follows:

Step 1-1

This consists in selecting those phases of the constellation, $\phi^1$ and $\phi^2$, which are closest to $\psi_n$, and those, phases $\phi^3$ and $\phi^4$, which are closest to $\psi_{n+1}$.

Step 1-2

This consists in calculating the four residual errors $$\hat{e}_n^{31} = \psi_n - \phi^1 - \hat{\theta}_n(\phi^3-\phi^1, \hat{\phi}_{n-1}-\phi^1) - \hat{\chi}_n(\hat{\phi}_{n-2}-\phi^1) \quad (24)$$

$$\hat{e}_n^{32} = \psi_n - \phi^2 - \hat{\theta}_n(\phi^3-\phi^2, \hat{\phi}_{n-1}-\phi^2) - \hat{\chi}_n(\hat{\phi}_{n-2}-\phi^2) \quad (25)$$

$$\hat{e}_n^{41} = \psi_n - \phi^1 - \hat{\theta}_n(\phi^4-\phi^1, \hat{\phi}_{n-1}-\phi^1) - \hat{\chi}_n(\hat{\phi}_{n-2}-\phi^1) \quad (26)$$

$$\hat{e}_n^{42} = \psi_n - \phi^2 - \hat{\theta}_n(\phi^4-\phi^2, \hat{\phi}_{n-1}-\phi^2) - \hat{\chi}_n(\hat{\phi}_{n-2}-\phi^2) \quad (27)$$

Note that $$\hat{e}_n^{31} = \hat{\epsilon}_n^{31} - \hat{\chi}_n(\hat{\phi}_{n-2} - \phi^1) \quad (28)$$

$$\hat{e}_n^{32} = \hat{\epsilon}_n^{32} - \hat{\chi}_n(\hat{\phi}_{n-1} - \phi^2) \quad (29)$$

$$\hat{e}_n^{41} = \hat{\epsilon}_n^{41} - \hat{\chi}_n(\hat{\phi}_{n-2} - \phi^1) \quad (30)$$

$$\hat{e}_n^{42} = \hat{\epsilon}_n^{42} - \hat{\chi}_n(\hat{\phi}_{n-2} - \phi^2) \quad (31)$$

where $\hat{\epsilon}_n^{31}$, $\hat{\epsilon}_n^{32}$, $\hat{\epsilon}_n^{41}$, and $\hat{\epsilon}_n^{42}$ are the residual errors calculated in step 1-2 of Case B. In this case, these are partial residual errors only.

Step 2

If the smallest residual error is
$\hat{e}_n^{31}$ or $\hat{e}_n^{41}$, then $\hat{\phi}_n - \phi^1$
If the smallest residual error is
$\hat{e}_n^{32}$ or $\hat{e}_n^{42}$, then $\hat{\phi}_n = \phi^2$

Step 3

The two terms $\hat{\theta}_n$ and $\hat{\chi}_n$ of the phase error are adjusted separately and in an adaptive manner.

The terms $\hat{\theta}_n$ are adjusted as in Case B, except that $e$ will be substituted for $\epsilon$.

A new estimated value of term $\hat{\theta}_n$ is obtained in accordance with the expression $$\hat{\theta}_{n+1}(\hat{\phi}_n-\hat{\phi}_{n-1}, \hat{\phi}_{n-2}-\hat{\phi}_{n-1}) = \hat{\theta}_n(\hat{\phi}_n-\hat{\phi}_{n-1}, \hat{\phi}_{n-2}-\hat{\phi}_{n-1}) + \mu\,\hat{e}_{n-1} \quad (22')$$

where
$\hat{e}_{n-1}$ is the residual error observed at the preceding signaling instant and which corresponds to the combination of phase changes $\hat{\phi}_n - \hat{\phi}_{n-1}$, $\hat{\phi}_{n-2} - \hat{\phi}_{n-1}$. The terms $\chi_n$ are adjusted as follows:

Upon completion of step 2, a new estimated value $\hat{\chi}_{n+1}(\hat{\phi}_{n-3} - \hat{\phi}_{n-1})$ is obtained in accordance with relation (32):

$$\hat{\chi}_{n+1}(\hat{\phi}_{n-3} - \hat{\phi}_{n-1}) = \hat{\chi}_n(\hat{\phi}_{n-3} - \hat{\phi}_{n-1}) + \mu\,\hat{e}_{n-1} \quad (32)$$

where $\hat{e}_{n-1}$ is the residual error found at the preceding signaling instant and which corresponds to the combination of phase changes $\hat{\phi}_n - \hat{\phi}_{n-1}$, $\hat{\phi}_{n-2} - \hat{\phi}_{n-1}$.

The apparatus used to implement the above method in Case C will now be described with reference to FIGS. 4A, 4B, and 5.

Detection of $\hat{\phi}_n$ (Steps 1 and 2)

The constellation phases $\phi^1$ and $\phi^2$ which are closest to $\psi_n$ and constellation phases $\phi^3$ and $\phi^4$ which are closest to $\psi_{n-1}$ are respectively available on lines 81, 82, 84 and 85 of the apparatus of FIG. 4A. The addresses A31, A32, A41 and A42 of the terms $\hat{\theta}_n$(A31), $\hat{\theta}_n$(A32), $\hat{\theta}_n$(A41) and $\hat{\theta}_n$(A42) stored in memory 104, FIG. 4B, are also available on lines 105-108 of the apparatus of FIG. 4. Similarly, the terms $\tilde{\epsilon}_n$(A31), $\tilde{\epsilon}_n$(A32), $\tilde{\epsilon}_n$(A41) and $\tilde{\epsilon}_n$(A42) remain available at the output of subtractors 223, 224, 225 and 226. The calculation of the residual errors defined by relations (28) to (31) makes it necessary to determine the terms $\hat{\chi}_n$ ($\hat{\phi}_{n-2} - \phi^1$) and $\hat{\chi}_n(\hat{\phi}_{n-2} - \phi^2)$. Accordingly, phase changes $\hat{\phi}_{n-2} - \phi^1$ and $\hat{\phi}_{n-2} - \phi^2$ must be determined. To this end, phase $\phi^1$ available on line 81 (FIG. 4A) is applied to the subtractive input of a two-bit (modulo 4) subtractor 233, FIG. 5, whose additive input receives phase $\hat{\phi}_{n-2}$ from the output of delay element 129 of FIG. 4A. Phase $\phi^2$ is available on line 82 (FIG. 4A) and is applied to the subtractive input of a two-bit (modulo 4) subtractor 234, FIG. 5, to whose additive input phase $\hat{\phi}_{n-2}$ is applied by line 172. Phase changes $\hat{\phi}_{n-2} - \phi^1$ and $\hat{\phi}_{n-2} - \phi^2$ respectively available at the output of subtractors 233 and 234 are fed to an addressing circuit 174 that controls the addressing of a memory 175. Memory 175 is a four-position random-access memory (RAM) storing the four possible values of term $\hat{\chi}_n$. Addressing circuit 174 controls the sequential read out from memory 175 of terms $\hat{\chi}_n$ ($\hat{\phi}_{n-2} - \phi^1$) and $\hat{\chi}_n$ ($\hat{\phi}_{n-2} - \phi^2$) which, as described above, are simultaneously available on lines 176 and 177. These terms read out of memory 175 are to be subtracted from partial residual errors $\tilde{\epsilon}_n$(A31), $\tilde{\epsilon}_n$(A41), $\tilde{\epsilon}_n$(A32) and $\tilde{\epsilon}_n$(A42) from subtractors 223-226, FIG. 4B, in accordance with relations (28) to (31). Subtractors 235-238 will be interposed in the output lines of subtractors 223-226 respectively, with each output connected to the additive input lead. The term $\hat{\chi}_n(\hat{\phi}_{n-2} - \phi^1)$ present on line 176 is applied in parallel to the subtractive inputs of the subtractors 235 and 236 whose additive inputs receive the partial errors $\tilde{\epsilon}_n$(A31) and $\tilde{\epsilon}_n$(A41) from subtractors 223 and 224 respectively. The term $\hat{\chi}_n$ ($\hat{\phi}_{n-2} - \phi^2$) present on line 177 is applied in parallel to the subtractive inputs of the two subtractors 237 and 238 whose additive inputs receive the partial residual errors $\tilde{\epsilon}_n$(A32) and $\tilde{\epsilon}_n$(A42) from the output of subtractors 225 and 226 respectively. The residual errors $\tilde{e}_n$(A31), $\tilde{e}_n$(A41), $\tilde{e}_n$(A32) and $\tilde{e}_n$(A42) as defined by relations (28) to (31) which thus become available at the output of subtractors 235 to 238 are the same as the terms on lines 86, 88, 109, and 111 of FIG. 4B and are fed to the selection circuit 49 of FIG. 4B and also to delay elements 123, to 126, as is done with the errors $\tilde{\epsilon}_n$ in Case B.

The remainder of the method of detecting $\hat{\phi}_n$ remains unchanged from the Case B and phase $\hat{\phi}_n$ becomes available at the output of OR gate 51 of FIG. 4A.

Adaptive Determination (Step 3)

The apparatus of FIG. 4 provides the term $\hat{\theta}_{n+1}$(ADR) as in Case B, but this result is achieved by using residual errors $\tilde{e}_n$(A31), $\tilde{e}_n$(A41), $\tilde{e}_n$(A32) and $\tilde{e}_n$(A42) which are now fed to delay elements 123-126, in lieu of residual errors $\tilde{\epsilon}_n$(A31), $\tilde{\epsilon}_n$(A41), $\tilde{\epsilon}_n$(A32) and $\tilde{\epsilon}_n$(42). Relation (22') is written $$\hat{\theta}_{n+1}(\text{ADR}) = \hat{\theta}_n(\text{ADR}) + \mu \tilde{e}_{n-1}(\text{ADR}) \qquad (22')$$

The term $\hat{\chi}_n$ to be adjusted is that which corresponds to phase change $\hat{\phi}_{n-3} - \hat{\phi}_{n-1}$. The address, designated ADR2, of this term in memory 175 is calculated as follows. Phase $\hat{\phi}_n$ obtained at the output of OR gate 51 of FIG. 4A on line 117 is the input to a delay element 178 whose output is connected to the input of another delay element 179. The output of delay element 179 is connected to the input of a third delay element 180. The three delay elements 178, 179 and 180 are identical and introduce a T-sec. delay each. The phase $\hat{\phi}_{n-1}$ obtained at the output of delay element 178 is subtracted in a modulo-4 subtractor 239 from the phase $\hat{\phi}_{n-3}$ obtained at the output of delay element 180. The phase change $\hat{\phi}_{n-3} - \hat{\phi}_{n-1}$ or address ADR2 is obtained at the output of subtractor 239. Address ADR2 is fed to addressing circuit 174 which controls the readout of the term $\hat{\chi}_n$(ADR2) stored at a corresponding storage location in memory 175. In accordance with relation (32), this term, which is provided on output line 181 is adjusted by using the residual error $\hat{e}_{n-1}$(ADR) available at the output of OR gate 141 of FIG. 4B.

The residual error $\tilde{e}_{n-1}$(ADR) is multiplied as above described by the constant $\mu$ in multiplier 182 and added in adder 240 to the term $\hat{\chi}_n$(ADR2) available on line 181. One thus obtains at the output of adder 240 the term $$\hat{\chi}_{n+1}(\text{ADR2}) = \hat{\chi}_n(\text{ADR2}) + \mu \tilde{e}_{n-1}(\text{ADR})$$

which is entered back into memory 175 at the same address ADR2 through input register 183.

The detection of phase $\hat{\phi}_{n+1}$ can then take place at the next signaling instant.

Those skilled in the art will appreciate that for all their apparent complexity, the devices shown in FIGS. 3 to 5 will require only a low computing power in practice since they necessitate only additions and subtractions that mostly involve two-bit words, and comparison operations. Also, most of the components of these devices, memories, addressing circuits, adders, and so forth, would already exist in a signal receiver using present-day technologies and would not have to be added to implement the subject method.

From the foregoing description of the method and apparatus of the invention in Cases A, B and C, with identification of those phases of the signal constellation which are closest to the received phases, it will be understood by those skilled in the art that the method can be used to compensate for the effects of the intersymbol interference created by not more than one leading lobe and/or an arbitrary number of trailing lobes. In its preferred, most general form, the present method, which includes identification of the phases of the constellation, may be defined as follows. (To prevent confusion with Cases A, B and C, as implemented in apparatus illustrated in FIGS. 3 to 5, some notations have been modified.)

Where the interference is created solely by the trailing lobes, the method of the present invention mainly includes the steps of:

selecting those phases, $\phi^1$ and $\phi^2$, of the constellation which are closest to received phase $\psi_n$, calculating the two residual errors $$\tilde{E}_n^L = \psi_n - \phi^L - \hat{e}_n^L(\hat{\phi}_{n-1} - \phi^L, \hat{\phi}_{n-2} - \phi^L, \ldots, \hat{\phi}_{n-N} - \phi^L)$$

for L = 1, 2 comparing the residual errors thus obtained, selecting as phase $\hat{\phi}_n$ whichever of phases $\phi^1$ and $\phi^2$ yields the smallest residual error, and adjusting the estimated phase error corresponding to $\hat{\phi}_n$.

Where the intersymbol interference is created by the first leading lobe and N trailing lobes, the method includes the steps of:

selecting those constellation phases, $\phi^1$ and $\phi^2$, which are closest to received phase $\psi_n$, and those constellation phases, $\phi^3$ and $\phi^4$, which are closest to received phase $\psi_{n-1}$, calculating the four residual errors $$\tilde{E}_n^{JL} = \psi_n - \phi^L - \hat{E}_n^{JL}(\phi^J - \phi^L, \hat{\phi}_{n-1} - \phi^L, \ldots \hat{\phi}_{n-N} - \phi^L)$$

for L = 1, 2 and J = 3, 4 comparing these residual errors with each other, selecting as phase $\hat{\phi}_n$ whichever of phases $\phi^1$ and $\phi^2$ yields the smallest residual error, and adjusting the estimated phase error corresponding to the combination of phase changes $$\hat{\phi}_n - \hat{\phi}_{n-1}, \hat{\phi}_{n-2} - \hat{\phi}_{n-1}, \ldots, \hat{\phi}_{n-(N+1)} - \hat{\phi}_{n-1}$$

in accordance with the residual error which was found at the preceding signaling instant and corresponds to that combination of phase changes.

While the invention has been particularly shown and described with reference to a preferred embodiment thereof, it will be understood by those skilled in the art that numerous changes in form and detail may be made therein without departing from the spirit and scope of the invention.

What is claimed is:

1. In a data transmission system using the PSK modulation technique wherein the phase of the signal transmitted at each of a sequence of signalling instants may be any one of the phases of a M- phase constellation, a phase detection method for determining an estimated value $\hat{\phi}_n$ of the phase transmitted at signalling instant nT and for compensating for the effects of the intersymbol interference created by not more than one leading lobe of a subsequent signal and/or an arbitrary number N of trailing lobes of preceding signals, said interference being caused by the impulse response of the transmission channel, said method comprising the steps of:

(a) determining the phase $\psi_n$ of the signal received at each signalling instant nT, (b) determining, for each signalling instant, at least two residual errors, each of which is obtained by subtracting from said received phase $\psi_n$, the value of one of the phases of the constellation combined with an estimated value of the phase error created by the intersymbol interference due to said preceding and said subsequent signals and corresponding to said one phase of the constellation, (c) comparing said residual errors thus obtained with each other and determining the smaller, (d) selecting as said transmitted phase $\hat{\phi}_n$, that phase of the constellation which yields said smaller residual error, and (e) selectively adjusting at least one of said estimated phase errors in accordance with the one of said determined residual errors related thereto.

2. The method of claim 1 for supplying an estimated value $\hat{\phi}_n$ of the phase $\phi_n$ and restricted to compensating for the effects of the intersymbol interference created only by an arbitrary number N of trailing lobes of preceding signals and due to the impulse response of the transmission channel, said method characterized in that step (b) comprises the steps of:

(b1) determining those phases $\phi^1$ and $\phi^2$ of the constellation, which are closest to said received phase $\psi_n$, and (b2) determining the two residual errors $$\tilde{E}_n^L = \psi_n - \phi^L - \hat{E}_n^L(\hat{\phi}_{n-1} - \phi^L, \hat{\phi}_{n-2} - \phi^L, \ldots, \hat{\phi}_{n-N} - \phi^L)$$

for L = 1 and 2 where $\tilde{E}_n^L$ is the estimated phase error which corresponds to phase $\phi^L$ and to the combination of phase changes $$\hat{\phi}_{n-1} - \phi^L, \hat{\phi}_{n-2} - \phi^L, \ldots, \hat{\phi}_{n-N} - \phi^L,$$

and $\hat{\phi}_{n-1}, \hat{\phi}_{n-2}, \ldots, \hat{\phi}_{n-N}$ are the estimated values of the phase of the preceding signals $\phi_{n-1}, \phi_{n-2}, \ldots, \phi_{n-N}$.

3. A method according to claim 1 for supplying an estimated value $\hat{\phi}_n$ of the phase $\phi_n$ of a received signal and for compensating for the effects of the intersymbol interference created by the first leading lobe of a succeeding signal and an arbitrary number N of trailing lobes of preceding signals, said interference being due to the impulse response of the transmission channel, said method further characterized in that step (b) comprises the steps of:

(b1) determining those phases of the constellation, $\phi^1$ and $\phi^2$, which are closest to the received phase $\psi_n$ of a signal, and those phases of the constellation, $\phi^3$ and $\phi^4$, which are closest to the received phase $\psi_{n+1}$ of a succeeding signal, and (b2) determining the four residual errors $$\tilde{E}_n^{JL} = \psi_n - \phi^L - \hat{E}_n^{JL}(\phi^J - \phi^L, \hat{\phi}_{n-1} - \phi^L, \ldots, \hat{\phi}_{n-N} - \phi^L)$$

for L = 1 and 2 and J = 3 and 4, where $\hat{E}_n^{JL}$ is the estimated phase error which corresponds to phase change $\phi^J - \phi^L$ between two adjacent signals and is dependent on the combination of phase changes $\phi^J - \phi^L, \hat{\phi}_{n-1} - \phi^L, \ldots, \hat{\phi}_{n-1}, \ldots, \hat{\phi}_{n-N}$ are estimated values of the phases $\phi_{n-1} \ldots \phi_{n-N}$ of previously received signals.

4. A method according to claim 3, characterized in that step e) is further characterized by:

(e') adjusting the phase error corresponding to the combination of phase changes $$\hat{\phi}_n - \hat{\phi}_{n-1}, \hat{\phi}_{n-2} - \hat{\phi}_{n-1}, \ldots, \hat{\phi}_{n-(N+1)} - \hat{\phi}_{n-1}$$

in accordance with the residual error that was observed at the preceding signalling instant and corresponds to the same combination of phase changes.

5. A method according to claim 1 for supplying an estimated value $\hat{\phi}_n$ of the phase $\phi_n$ of a received signal and for compensating for the effects of the intersymbol interference created by the first leading lobe of a subsequent signal and the trailing lobes of two preceding signals, said lobes being due to the impulse response of the transmission channel, said method characterized in that step (b) consists in:

(b') determining at least two residual errors $$\tilde{e}_n^{jl} = \psi_n - \phi^j - \hat{\theta}_n(\phi^j - \phi^l, \hat{\phi}_{n-1} - \phi^l) - \hat{\chi}_n(\hat{\phi}_{n-2} - \phi^l)$$

$\phi^j$ and $\phi^l$ represent the phases of the signal constellation, $\hat{\theta}_n(\phi^j - \phi^l, \hat{\phi}_{n-1} - \phi^l)$ is a first term of the estimated phase error that is created by said first leading lobe and said first trailing lobe, said first term being dependent on the combination of phase changes $\phi^j - \phi^l$, $\hat{\phi}_{n-1} - \phi^l$, $\hat{\chi}_n(\hat{\phi}_{n-2} - \phi^l)$ is a second term of said estimated phase error, said second term being created by said second trailing lobe and being dependent on phase change $\hat{\phi}_{n-2} - \phi^l$, and $\hat{\phi}_{n-1}$ and $\hat{\phi}_{n-2}$ are the estimated values of the transmitted phases $\phi_{n-1}$ and $\phi_{n-2}$.

6. A method according to claim 5, further characterized in that step (b') comprises the steps of:
(b'1) determining those phases $\phi^1$ and $\phi^2$, of the constellation which are closest to received phase $\psi_n$, and those phases $\phi^3$ and $\phi^4$, of the constellation which are closest to received phase $\psi_{n+1}$, and
(b'2) determining the four residual errors $\hat{e}_n^{jl}$ for $l = 1, 2$ and $j = 3, 4$.

7. A method according to claim 6, further characterized in that step (e) comprises the steps of:
(e'1) adjusting the term $\hat{\theta}_n$ of the estimated phase error that corresponds to the combination of phase changes $$\hat{\phi}_n - \hat{\phi}_{n-1}, \hat{\phi}_{n-2} - \hat{\phi}_{n-1}$$

in accordance with the residual error that was observed at the preceding signalling instant and which corresponds to that combination of phase changes, and
(e'2) adjusting the term $\hat{\chi}_n$ of the estimated phase error that corresponds to phase change $\hat{\phi}_{n-1} - \hat{\phi}_{n-1}$ in accordance with said same residual error.

8. In a data transmission system using the PSK modulation technique wherein the phase of the signal transmitted over a transmission line at each signalling instant may be any one of the phases of an M- phase signal constellation, said system having a receiver including a phase detection apparatus supplying a phase value $\hat{\phi}_n$ as an estimated value of the phase $\phi_n$ transmitted at signalling instant nT and operating to compensate for the effects of the intersymbol interference created by an arbitrary number N of the trailing lobes of preceding signals as a result of the impulse response of the transmission channel, said phase detection apparatus characterized in that it includes:
an input means receiving the value of the phase $\psi_n$ of a signal received at a signalling instant nT,
a selection means connected to said input means for determining those phases $\phi^1$ and $\phi^2$, of the constellation, which are closest in value to the value of said received phase $\psi_n$,
a storage means for storing the estimated values of the phases $\hat{\phi}_{n-1}, \hat{\phi}_{n-2}, \ldots, \hat{\phi}_{n-N}$ determined for preceding signals,
means receiving the outputs of said selection means and said storage means for calculating the values of phase changes $\hat{\phi}_{n-1} - \phi^1, \ldots, \hat{\phi}_{n-N} - \phi^1$ and $\hat{\phi}_{n-1} - \phi^2, \ldots, \hat{\phi}_{n-N} - \phi^2$, a first address means responsive to said calculating means for forming a first address representative of the combination of phase changes $$\hat{\phi}_{n-1} - \phi^1, \hat{\phi}_{n-2} - \phi^1, \ldots, \hat{\phi}_{n-N} - \phi^1,$$

a second address means responsive to said calculating means for forming a second address representative of the combination of phase changes $$\hat{\phi}_{n-1} - \phi^2, \hat{\phi}_{n-2} - \phi^2, \ldots, \hat{\phi}_{n-N} - \phi^2,$$

an addressable storage means for storing estimated values of the possible phase errors,
a storage addressing means settable by said first and second address means for controlling the readout of the estimated phase errors $\hat{E}_n^1$ and $\hat{E}_n^2$ respectively stored at the first and second addresses of said storage means,
a means settable by said input means and said selection means for calculating the value of phase changes $$\psi_n - \phi^1 \text{ and } \psi_n - \phi^2$$

means connected to said settable mean and said storage means for calculating the values of the residual errors $$\tilde{E}_n^1 = \psi_n - \phi^1 - \hat{E}_n^1$$

and $$\tilde{E}_n^2 = \psi_n - \phi^2 \, 2\hat{E}_n^2$$

means responsive to said residual error calculating means for comparing these two residual errors and selecting as phase $\hat{\phi}_n$ the one of phases $\phi^1$ and $\phi^2$ which yields the smaller residual error, and
adjustment means settable by said storage and by said residual error comparing means for adjusting the estimated phase error corresponding to $\hat{\phi}_n$ in accordance with the smallest residual error, and for storing the adjusted estimated phase error at the same storage address.

9. In a data transmission system using the PSK modulation technique wherein the phase of the signal transmitted over a transmission line at each signalling instant can be any one of the phases of an M- phase signal constellation, said system having a receiver including a phase detection apparatus supplyin a phase value $\phi_n$ as an estimated value of the phase $\hat{\phi}_n$ transmitted at signalling instant nT and operating to compensate for the effects of the intersymbol interference created by the first leading lobe of a succeeding signal and an arbitrary number N of the trailing lobes of preceding signals as a result of the impulse response of the transmission channel, said phase detection apparatus characterized in that it includes:
an input means receiving the value of the phase $\psi_{n+1}$ of a signal received at instant (n+1) T,
a delay means whose input is connected to said input means and whose output provides the value of the phase $\psi_n$ of the signal received at instant nT, said delay means introducing a T-sec. delay,
a first selection means connected to the output of said delay for determining those phases $\phi^1$ and $\phi^2$, of the constellation, which are closest to phase $\psi_n$, a second selection means connected to said input means for determining those phases $\phi^3$ and $\phi^4$, of the constellation, which are closest to phase $\psi_{n+1}$, means for storing the estimated values of the phases $\hat{\phi}_{n-1}, \hat{\phi}_{n-2}, \ldots, \hat{\phi}_{n-N}$ determined for preceding signals, means receiving outputs from both said selection means and from said storage means for calculating the values of phase changes $\phi^3 - \phi^1, \phi^4 - \phi^1, \phi^3 - \phi^2, \phi^4 - \phi^2, \hat{\phi}_{n-1} - \phi^1, \ldots, \hat{\phi}_{n-N} - \phi^1, \hat{\phi}_{n-1} - \phi^2, \ldots, \hat{\phi}_{n-N} - \phi^2$, a first means connected to said calculating means for forming a first address representative of each of the combination of phase changes $$\phi^3 - \phi^1, \hat{\phi}_{n-1} - \phi^1, \hat{\phi}_{n-2} - \phi^1, \ldots, \hat{\phi}_{n-N} - \phi^1,$$

a second means also connected to said calculating means for forming a second address representative of each of the combination of phase changes $$\phi^3 - \phi^2, \hat{\phi}_{n-1} - \phi^2, \hat{\phi}_{n-2} - \phi^2, \ldots, \hat{\phi}_{n-N} - \phi^2,$$

a third means also connected to said calculating means for forming a third address representative of each of the combination of phase changes $$\phi^4 - \phi^1, \hat{\phi}_{n-1} - \phi^1, \ldots, \hat{\phi}_{n-N} - \phi^1,$$

a fourth means connected to said calculating means for forming a fourth address representative of each of the combination of phase changes $$\phi^4 - \phi^2, \hat{\phi}_{n-1} - \phi^2, \ldots, \hat{\phi}_{n-N} - \phi^2,$$

an addressable storage means for storing estimated values of all of the possible phase errors, a storage addressing means controlled by said four address forming means for controlling the readout of the estimated phase errors $$\hat{E}_n^{31}, \hat{E}_n^{32}, \hat{E}_n^{41} \text{ and } \hat{E}_n^{42}$$

respectively stored at said first, second, third and fourth addresses of said storage means, means responsive to said input means and said first selection means for calculating the values of the phase changes $$\psi_n - \phi^1 \text{ and } \psi_n - \phi^2,$$

means connected to said phase change calculating means and said storage means for calculating the values of revised residual errors $$\tilde{E}_n^{31} = \psi_n - \phi^1 - \hat{E}_n^{31}$$

$$\tilde{E}_n^{32} = \psi_n - \phi^2 - \hat{E}_n^{32}$$

$$\tilde{E}_n^{41} = \psi_n - \phi^1 - \hat{E}_n^{42}$$

$$\tilde{E}_n^{42} = \psi_n - \phi^2 - \hat{E}_n^{42}$$

means receiving the values of said revised residual errors to compare these residual errors and select therefrom as phase $\hat{\phi}_n$ the one of phases $\phi^1$ and $\phi^2$ which corresponds to the smallest residual error, and adjustment means connected to said comparing means and said storage means for adjusting the stored estimated phase error corresponding to the address representative of the combination of phase changes $$\hat{\phi}_n - \hat{\phi}_{n-1}, \hat{\phi}_{n-2} - \hat{\phi}_{n-1}, \ldots, \hat{\phi}_{n-(N+1)} - \hat{\phi}_{n-N}$$

in accordance with the residual error observed at the preceding signalling instant and corresponding to that combination of phase changes.

10. In a data transmission system using the PSK modulation technique wherein the phase of the signal transmitted over a transmission line at each signalling instant can be any one of the phases of a 4-phase constellation, said system having a receiver including a phase detection apparatus supplying a phase value $\hat{\phi}_n$ as an estimated value of the phase $\phi_n$ transmitted at signalling instant nT and operating to compensate for the effects of the intersymbol interference created by the first trailing lobe of a preceding signal, said lobe being caused by the impulse response of the transmission channel, said phase detection apparatus characterized in that it includes:

an input means to receive the value of the phase $\psi_n$ of a signal received at signalling instant nT, a selection means connected to said input means for determining those phases $\phi^1$ and $\phi^2$, of the constellation which are closest in value to the value of said received phase $\psi_n$, a means for storing the estimated value $\hat{\phi}_{n-1}$ previously determined for the preceding signal, means connected to said selection means and said storing means for calculating the values of phase changes $$\hat{\phi}_{n-1} - \phi^1 \text{ and } \hat{\phi}_{n-1} - \phi^2$$

means receiving the value of the first of said phase changes for forming a first address representative of phase change $\hat{\phi}_{n-1} - \phi^1$, means receiving the value of the other of said phase changes for forming a second address representative of phase change $\hat{\phi}_{n-1} - \phi^2$, an addressable storage means for storing previously determined estimated values of the possible phase errors, addressing means controlled by both said address forming means for controlling the readout from said storage means of the values of the estimated phase errors $$\hat{\epsilon}_n (\hat{\phi}_{n-1} - \phi^1) \text{ and } \hat{\epsilon}_n (\hat{\phi}_{n-1} - \phi^2)$$

said errors being respectively stored at the first and second addresses of said storage means, a first means receiving values from said input means and said selection means for calculating the values of the phase changes $$\psi_n - \phi^1 \text{ and } \psi_n - \phi^2,$$

a second means activated by said first calculating means and the output of said addressable storage means for calculating the values of the residual errors $$\tilde{\epsilon}_n^1 = \psi_n - \phi^1 - \hat{\epsilon}_n (\hat{\phi}_{n-1} - \phi^1)$$

$$\tilde{\epsilon}_n^2 = \psi_n - \phi^2 - \hat{\epsilon}_n (\hat{\phi}_{n-1} - \phi^2)$$

means responsive to said second calculating means for comparing residual errors $\hat{\varepsilon}_n^1$ and $\hat{\varepsilon}_n^2$ and for selecting as phase $\hat{\phi}_n$ the one of phases $\phi^1$ and $\phi^2$ which yields the smaller residual error, and adjustment means connected to said storage means to modify the stored value of the estimated phase error that corresponds to the selected $\hat{\phi}_n$ having the smaller residual error, and for storing the new estimated value of said phase error thus obtained at the corresponding address.

11. In a data transmission system using the PSK modulation technique wherein the phase of the signal transmitted over a transmission line at each signalling instant can be any one of the phases of a 4-phase signal constellation, said system having a receiver including a phase detection apparatus supplying a phase value $\hat{\phi}_n$ as an estimated value of the phase $\phi_n$ transmitted at signalling instant nT and operating to compensate for the effects of the intersymbol interference created by the first leading lobe of a succeeding signal and the first trailing lobe of the preceding signal, said lobes being due to the impulse response of the transmission channel, said phase detection apparatus being characterized in that it includes:

an input means receiving the value of the phase $\psi_{n+1}$ transmitted at signalling instant $(n+1)T$, a delay means whose input is connected to said input means and whose output provides the value $\psi_n$ of the signal received at instant nT, said delay means introducing a delay of T seconds, a first selection means coupled to the output of said delay means for determining the value of those phases, $\phi^1$ and $\phi^2$, of the constellation which are closest to phase $\psi_n$, a second selection means connected to said input means for determining the values of those phases $\phi^3$ and $\phi^4$ of the constellation which are closest to phase $\psi_{n+1}$, a means for storing the estimated value $\hat{\phi}_{n-1}$ of the phase determined for the preceding signal, a means for receiving the outputs of said two selection means and said storing means and calculating phase changes $$\phi^3 - \phi^1, \phi^3 - \phi^2, \phi^4 - \phi^1, \phi^4 - \phi^2, \hat{\phi}_{n-1} - \phi^1, \hat{\phi}_{n-1} - \phi^2,$$

means responsive to said calculating means for forming addresses A31, A32, A41 and A42 respectively representative of the combinations of phase changes $$\phi^3 - \phi^1, \hat{\phi}_{n-1} - \phi^1$$

$$\phi^3 - \phi^2, \hat{\phi}_{n-1} - \phi^2$$

$$\phi^4 - \phi^1, \hat{\phi}_{n-1} - \phi^1$$

$$\phi^4 - \phi^2, \hat{\phi}_{n-1} - \phi^2$$

an addressable storage means for storing estimated values of the possible phase errors, an addressing means controlled by said address forming means to control the readout from said storage means of the estimated phase errors $$\hat{\theta}_n(\phi^3-\phi^1, \hat{\phi}_{n-1}-\phi^1), \hat{\theta}_n(\phi^3-\phi^2, \hat{\phi}_{n-1}-\phi^2),$$
$$\hat{\theta}_n(\phi^4-\phi^1, \hat{\phi}_{n-1}-\phi^1) \text{ and } \hat{\theta}_n(\phi^4-\phi^2, \hat{\phi}_{n-1}-\phi^2)$$

stored at said formed addresses A31, A32, A41 and A42, means receiving the phase value $\psi_n$ and connected to said first selection means for calculating the values of phase changes $$\psi_n - \phi^1 \text{ and } \psi_n - \phi^2$$

means at the output of said storage means and said phase change calculating means for calculating the values of residual errors $$\hat{\varepsilon}_n^{31} = \psi_n - \phi^1 - \hat{\theta}_n(\phi^3 - \phi^1, \hat{\phi}_{n-1} - \phi^1)$$

$$\hat{\varepsilon}_n^{32} = \psi_n - \phi^2 - \hat{\theta}_n(\phi^3 - \phi^2, \hat{\phi}_{n-1} - \phi^2)$$

$$\hat{\varepsilon}_n^{41} = \psi_n - \phi^1 - \hat{\theta}_n(\phi^4 - \phi^1, \hat{\phi}_{n-1} - \phi^1)$$

and $$\hat{\varepsilon}_n^{42} = \psi_n - \phi^2 - \hat{\theta}_n(\phi^4 - \phi^2, \hat{\phi}_{n-1} - \phi^2)$$

a means on the output of said residual error calculating means for receiving and comparing said residual errors and selecting therefrom as phase $\hat{\phi}_n$ the one of phases $\phi^1$ and $\phi^2$ which yields the smallest residual error, and means connected to said receiving and comparing means for adjusting the estimated phase error value stored at the storage address representative of the combination of phase changes $$\hat{\phi}_n - \hat{\phi}_{n-1}, \hat{\phi}_{n-2} - \hat{\phi}_{n-1}$$

to accord with the residual error observed at the preceding signalling instant and corresponding to that combination of phase changes.

12. In a data transmission system using the PSK modulation technique wherein the phase of the signal transmitted over a transmission line at each signalling instant can be any one of the phases of a 4-phase signal constellation, said system having a receiver including a phase detection apparatus supplying a phase value $\hat{\phi}_n$ as an estimated value of the phase $\phi_n$ transmitted at signalling instant nT and operating to compensate for the effects of the intersymbol interference created by the first leading lobe of a succeeding signal and the trailing lobes of two preceding signals, said lobes being caused by the impulse response of the transmission channel, said phase detection apparatus characterized in that it includes:

an input means receiving the value of the phase $\phi_{n+1}$ of a signal received at signalling instant $(n+1)T$, a delay means whose input is connected to said input means and whose output provides the value $\phi_n$ of the phase received at prior signalling instant nT, said delay means introducing a delay of T seconds, a first selection means on the output of said delay means for determining those phases $\phi^1$ and $\phi^2$, of the constellation, which are closest to phase $\phi_n$, a second selection means connected to said input for determining those phases $\phi^3$ and $\phi^4$, of the constellation which are closest to phase $\psi_{n+1}$, a means for retaining the estimated value $\hat{\phi}_{n-1}$ previously determined for a preceding signal, a first means responsive to both said selecting means and said retaining means for calculating the values of phase changes $$\phi^3 - \phi^1, \phi^3 - \phi^2, \phi^4 - \phi^1, \phi^2, \hat{\phi}_{n-1} - \phi^1, \hat{\phi}_{n-1} - \phi^2,$$

a first means connected to said phase changes calculating means for forming addresses A31, A32, A41 and A42 respectively representative of the combinations of phase changes $$A31 = \phi^3 - \phi^1, \hat{\phi}_{n-1} - \phi^1$$
$$A32 = \phi^3 - \phi^2, \hat{\phi}_{n-1} - \phi^2$$
$$A41 = \phi^4 - \phi^1, \hat{\phi}_{n-1} - \phi^1$$
$$A42 = \phi^4 - \phi^2, \hat{\phi}_{n-1} - \phi^2$$

a first addressable storage means for storing approximations of the possible values of the first term of a phase error, said term being dependent on the combination of phase changes $$\phi_{n+1} - \phi_n, \phi_{n-1} - \phi_n$$

a first addressing means set by said address forming means for controlling the readout of the estimated values of phase error $$\hat{\theta}_n(\phi^3-\phi^1, \hat{\phi}_{n-1}-\phi^1), \hat{\theta}_n(\phi^3-\phi^2, \hat{\phi}_{n-1}-\phi^2)$$
$$\hat{\theta}_n(\phi^4-\phi^1, \hat{\phi}_{n-1}-\phi^1) \text{ and } \hat{\theta}_n(\phi^4-\phi^2, \hat{\phi}_{n-1}-\phi^2)$$

respectively stored at addresses A31, A32, A41 and A42 of said first addressable storage means,
means on the outputs of said first selection means and said delay means for calculating phase changes $$\psi_n - \phi^1 \text{ and } \psi_n - \phi^2$$

a means for calculating a set of partial residual errors from the output terms of said phase error storage and said phase change calculating means, $$\tilde{\epsilon}_n^{31} = \psi_n - \hat{\theta}_n(\phi^3 - \phi^1, \hat{\phi}_{n-1} - \phi^1)$$
$$\tilde{\epsilon}_n^{32} = \psi_n - \phi^2 - \hat{\theta}_n(\phi^3 - \phi^2, \hat{\phi}_{n-1} - \phi^2)$$
$$\tilde{\epsilon}_n^{41} = \psi_n - \phi^1 - \hat{\theta}_n(\phi^4 - \phi^1, \hat{\phi}_{n-1} - \phi^1)$$
$$\tilde{\epsilon}_n^{42} = \psi_n - \phi^2 - \hat{\theta}_n(\phi^4 - \phi^2, \hat{\phi}_{n-1} - \phi^2)$$

a holding means on the output of said delay means for storing the estimated value $\hat{\phi}_{n-2}$ of the phase previously determined for a preceding signal,
another means responsive to said holding means and said first selection means for calculating the values of phase changes $$\hat{\phi}_{n-2} - \phi^1 \text{ and } \hat{\phi}_{n-2} - \phi^2$$

a second address forming means responsive to said another phase change calculating means for forming addresses representative of the values of phase changes $$\hat{\phi}_{n-2} - \phi^1 \text{ and } \hat{\phi}_{n-2} - \phi^2$$

a second addressable storage means for storing approximations of the possible values of the second term of a phase error, said second term being dependent on said phase change $$\phi_{n-2} - \phi_n,$$

a second addressing means responsive to said second address forming means for controlling the readout of the approximate error values from said second storage means, said error values being the values $$\hat{\chi}_n(\hat{\phi}_{n-2} - \phi^1) \text{ and } \hat{\chi}_n(\hat{\phi}_{n-2} - \phi^2)$$

stored at said addresses of said second storage means which are representative of the values of phase changes $$\hat{\phi}_{n-2} - \phi^1 \text{ and } \hat{\phi}_{n-2} - \phi^2$$

means responsive to the outputs of said means for calculating partial residual errors and to the outputs of said second addressable storage for calculating the values of the residual errors $$\tilde{\epsilon}_n^{31} = \tilde{\epsilon}_n^{31} - \hat{\chi}_n(\hat{\phi}_{n-2} - \phi^1)$$
$$\tilde{\epsilon}_n^{32} = \tilde{\epsilon}_n^{32} - \hat{\chi}_n(\hat{\phi}_{n-2} - \phi^2)$$
$$\tilde{\epsilon}_n^{41} = \tilde{\epsilon}_n^{41} - \hat{\chi}_n(\hat{\phi}_{n-2} - \phi^1)$$
$$\tilde{\epsilon}_n^{42} = \tilde{\epsilon}_n^{42} - \hat{\chi}_n(\hat{\phi}_{n-2} - \phi^2)$$

a means on the output of said residual error calculating means for comprising the values of said residual errors and for selecting thereon as the value of phase $\phi_n$ the one of phases $\phi^1$ and $\phi^2$ which corresponds to the smallest residual error,
a means on the input of said first addressable storage for adjusting the term of the estimated phase error which was read from the address representative of the combination of phase changes $$\hat{\phi}_n - \hat{\phi}_{n-1}, \hat{\phi}_{n-2} - \hat{\phi}_{n-1}$$

in said first storage means, said adjustment being in accordance with the residual error that was obtained at the preceding signalling instant and corresponds to said combination of phase changes, and
another means on the input of said second addressable storage term of the estimated phase error which was read from the address representative of the combination of phase changes $$\hat{\phi}_{n-3} - \hat{\phi}_n$$

in said second storage means, said adjustment being in accordance with the residual error that was observed at the preceding signalling instant and corresponds to the combination of phase changes $$\hat{\phi}_n - \hat{\phi}_{n-1}, \hat{\phi}_{n-2} - \hat{\phi}_{n-1}.$$
* * * * *